United States Patent
Seth et al.

(10) Patent No.: US 10,397,085 B1
(45) Date of Patent: Aug. 27, 2019

(54) OFFLOADING HEARTBEAT RESPONSES MESSAGE PROCESSING TO A KERNEL OF A NETWORK DEVICE

(71) Applicant: Juniper Networks, Inc., Sunnyvale, CA (US)

(72) Inventors: Sameer Seth, Bangalore (IN); Ananda Kumar M R, Bangalore (IN); Srushti Gowdru Shivakumara, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 382 days.

(21) Appl. No.: 15/198,756

(22) Filed: Jun. 30, 2016

(51) Int. Cl.
*H04L 12/26* (2006.01)

(52) U.S. Cl.
CPC .................................. *H04L 43/10* (2013.01)

(58) Field of Classification Search
CPC ....................................................... H04L 43/10
See application file for complete search history.

(56) References Cited

U.S. PATENT DOCUMENTS

| | | |
|---|---|---|
| 5,253,248 A | 10/1993 | Dravida et al. |
| 5,613,136 A | 3/1997 | Casavant et al. |
| 5,721,855 A | 2/1998 | Hinton et al. |
| 5,826,081 A | 10/1998 | Zolnowsky |
| 5,848,128 A | 12/1998 | Frey |
| 5,933,601 A | 8/1999 | Fanshier et al. |
| 6,052,720 A | 4/2000 | Traversat et al. |
| 6,101,500 A | 8/2000 | Lau |
| 6,148,337 A | 11/2000 | Estberg et al. |
| 6,163,544 A | 12/2000 | Andersson et al. |

(Continued)

FOREIGN PATENT DOCUMENTS

| | | |
|---|---|---|
| EP | 1367750 A1 | 12/2003 |
| EP | 1816801 A | 8/2007 |

(Continued)

OTHER PUBLICATIONS

"ActiveXperts Ping backgrounds (PING is part of the ActiveSocket Toolkit)," ActiveSocket Network Communication Toolkit 2.4, Activexperts, retrieved from www.activexperts.com/activsocket/toolkits/ping.html, Nov. 10, 2005, 3 pp.

(Continued)

*Primary Examiner* — Michael A Keller
(74) *Attorney, Agent, or Firm* — Shumaker & Sieffert, P.A.

(57) ABSTRACT

In an example of this disclosure, a method may include receiving, by a first network device, a plurality of heartbeat response messages from one or more network devices of a plurality of network devices. Each heartbeat response message of the plurality of heartbeat response messages may respectively correspond to one network device of the plurality of network devices. The method may include processing, by the first network device, the plurality of heartbeat response messages in a kernel space of the first network device. The method may include updating, by the first network device in the kernel space, one or more values corresponding to a data structure based on processing the plurality of heartbeat response messages in the kernel space. The method may include processing, by the first network device, the one or more values in a user space of the first network device.

23 Claims, 6 Drawing Sheets

(56) References Cited

U.S. PATENT DOCUMENTS

| | | |
|---|---|---|
| 6,173,411 B1 | 1/2001 | Hirst et al. |
| 6,212,559 B1 | 4/2001 | Bixler et al. |
| 6,223,260 B1 | 4/2001 | Gujral et al. |
| 6,255,943 B1 | 7/2001 | Lewis et al. |
| 6,263,346 B1 | 7/2001 | Rodriquez |
| 6,272,537 B1 | 8/2001 | Kekic et al. |
| 6,304,546 B1 | 10/2001 | Natarajan et al. |
| 6,310,890 B1 | 10/2001 | Choi |
| 6,374,329 B1 | 4/2002 | McKinney et al. |
| 6,389,464 B1 | 5/2002 | Krishnamurthy et al. |
| 6,393,481 B1 | 5/2002 | Deo et al. |
| 6,405,289 B1 | 6/2002 | Arimilli et al. |
| 6,453,403 B1 | 9/2002 | Czajkowski |
| 6,453,430 B1 | 9/2002 | Singh et al. |
| 6,466,973 B2 | 10/2002 | Jaffe |
| 6,477,566 B1 | 11/2002 | Davis et al. |
| 6,477,572 B1 | 11/2002 | Elderton et al. |
| 6,480,955 B1 | 11/2002 | DeKoning et al. |
| 6,502,131 B1 | 12/2002 | Vaid et al. |
| 6,507,869 B1 | 1/2003 | Franke et al. |
| 6,510,164 B1 | 1/2003 | Ramaswamy et al. |
| 6,516,345 B1 | 2/2003 | Kracht |
| 6,529,941 B2 | 3/2003 | Haley et al. |
| 6,542,934 B1 | 4/2003 | Bader et al. |
| 6,563,800 B1 | 5/2003 | Salo et al. |
| 6,584,499 B1 | 6/2003 | Jantz et al. |
| 6,618,360 B1 | 9/2003 | Scoville et al. |
| 6,636,242 B2 | 10/2003 | Bowman-Amuah |
| 6,662,221 B1 | 12/2003 | Gonda et al. |
| 6,681,232 B1 | 1/2004 | Sistanizadeh et al. |
| 6,684,343 B1 | 1/2004 | Bouchier et al. |
| 6,725,317 B1 | 4/2004 | Bouchier et al. |
| 6,738,908 B1 | 5/2004 | Bonn et al. |
| 6,751,188 B1 | 6/2004 | Medved et al. |
| 6,757,897 B1 | 6/2004 | Shi et al. |
| 6,804,816 B1 | 10/2004 | Liu et al. |
| 6,816,897 B2 | 11/2004 | McGuire |
| 6,816,905 B1 | 11/2004 | Sheets et al. |
| 6,850,253 B1 | 2/2005 | Bazerman et al. |
| 6,910,148 B1 | 6/2005 | Ho et al. |
| 6,922,685 B2 | 7/2005 | Greene et al. |
| 6,934,745 B2 | 8/2005 | Krautkremer |
| 6,952,728 B1 | 10/2005 | Alles et al. |
| 6,982,953 B1 | 1/2006 | Swales |
| 6,983,317 B1 | 1/2006 | Bishop et al. |
| 6,990,517 B1 | 1/2006 | Bevan et al. |
| 7,024,450 B1 | 4/2006 | Deo et al. |
| 7,055,063 B2 | 5/2006 | Leymann et al. |
| 7,069,344 B2 | 6/2006 | Carolan et al. |
| 7,082,463 B1 | 7/2006 | Bradley et al. |
| 7,082,464 B2 | 7/2006 | Hasan et al. |
| 7,085,277 B1 | 8/2006 | Proulx et al. |
| 7,085,827 B2 | 8/2006 | Ishizaki et al. |
| 7,093,280 B2 | 8/2006 | Ke et al. |
| 7,099,912 B2 | 8/2006 | Ishizaki et al. |
| 7,103,647 B2 | 9/2006 | Aziz |
| 7,120,693 B2 | 10/2006 | Chang et al. |
| 7,124,289 B1 | 10/2006 | Suorsa |
| 7,130,304 B1 | 10/2006 | Aggarwal |
| 7,131,123 B2 | 10/2006 | Suorsa et al. |
| 7,139,263 B2 | 11/2006 | Miller et al. |
| 7,151,775 B1 | 12/2006 | Renwick et al. |
| 7,152,109 B2 | 12/2006 | Suorsa et al. |
| 7,161,946 B1 | 1/2007 | Jha |
| 7,184,437 B1 | 2/2007 | Cole et al. |
| 7,200,662 B2 | 4/2007 | Hasan et al. |
| 7,206,836 B2 | 4/2007 | Dinker et al. |
| 7,219,030 B2 | 5/2007 | Ohtani |
| 7,236,453 B2 | 6/2007 | Visser et al. |
| 7,305,492 B2 | 12/2007 | Bryers et al. |
| 7,310,314 B1 | 12/2007 | Katz et al. |
| 7,310,666 B2 | 12/2007 | Benfield et al. |
| 7,313,611 B1 | 12/2007 | Jacobs et al. |
| 7,336,615 B1 | 2/2008 | Pan et al. |
| 7,359,377 B1 | 4/2008 | Kompella et al. |
| 7,362,700 B2 | 4/2008 | Frick et al. |
| 7,363,353 B2 | 4/2008 | Ganesan et al. |
| 7,379,987 B2 | 5/2008 | Ishizaki et al. |
| 7,391,719 B2 | 6/2008 | Ellis et al. |
| 7,406,030 B1 | 7/2008 | Rijsman |
| 7,406,035 B2 | 7/2008 | Harvey et al. |
| 7,433,320 B2 | 10/2008 | Previdi et al. |
| 7,447,167 B2 | 11/2008 | Nadeau et al. |
| 7,463,591 B1 | 12/2008 | Kompella et al. |
| 7,471,638 B2 | 12/2008 | Torrey et al. |
| 7,487,232 B1 | 2/2009 | Matthews et al. |
| 7,499,395 B2 | 3/2009 | Rahman et al. |
| 7,506,194 B2 | 3/2009 | Appanna et al. |
| 7,508,772 B1 | 3/2009 | Ward et al. |
| 7,522,599 B1 | 4/2009 | Aggarwal et al. |
| 7,523,185 B1 | 4/2009 | Ng et al. |
| 7,539,769 B2 | 5/2009 | McGuire |
| 7,561,527 B1 | 7/2009 | Katz et al. |
| 7,606,898 B1 | 10/2009 | Hunt et al. |
| 7,609,637 B2 | 10/2009 | Doshi et al. |
| 7,639,624 B2 | 12/2009 | McGee et al. |
| 7,720,047 B1 | 5/2010 | Katz et al. |
| 7,720,061 B1 | 5/2010 | Krishnaswamy et al. |
| 7,724,677 B2 | 5/2010 | Iwami |
| 7,738,367 B1 | 6/2010 | Aggarwal et al. |
| 7,760,652 B2 | 7/2010 | Tsillas et al. |
| 7,764,599 B2 | 7/2010 | Doi et al. |
| 7,765,306 B2 | 7/2010 | Filsfills et al. |
| 7,765,328 B2 | 7/2010 | Bryers et al. |
| 7,813,267 B2 | 10/2010 | Tsai et al. |
| 7,852,778 B1 | 12/2010 | Kompella |
| 7,860,981 B1 | 12/2010 | Vinokour et al. |
| 7,911,938 B2 | 3/2011 | Florit et al. |
| 7,940,646 B1 | 5/2011 | Aggarwal et al. |
| 7,957,330 B1 | 6/2011 | Bahadur et al. |
| 7,990,888 B2 | 8/2011 | Nadeau et al. |
| 8,019,835 B2 | 9/2011 | Suorsa et al. |
| 8,077,726 B1 | 12/2011 | Kumar et al. |
| 8,189,579 B1 | 5/2012 | Krishnaswamy et al. |
| 8,254,271 B1 | 8/2012 | Nadeau et al. |
| 8,266,264 B2 | 9/2012 | Hasan et al. |
| 8,339,959 B1 | 12/2012 | Moisand et al. |
| 8,370,528 B2 | 2/2013 | Bryers et al. |
| 8,488,444 B2 | 7/2013 | Filsfils et al. |
| 8,503,293 B2 | 8/2013 | Raszuk |
| 8,543,718 B2 | 9/2013 | Rahman |
| 8,693,398 B1 | 4/2014 | Chaganti et al. |
| 8,797,886 B1 | 8/2014 | Kompella et al. |
| 8,902,780 B1 | 12/2014 | Hedge et al. |
| 8,948,001 B2 | 2/2015 | Guichard et al. |
| 8,953,460 B1 | 2/2015 | Addepalli et al. |
| 9,258,234 B1 | 2/2016 | Addepalli et al. |
| 9,455,894 B1 | 9/2016 | Neelam et al. |
| 9,578,567 B1 * | 2/2017 | Laganier ............. H04L 41/0668 |
| 2001/0042190 A1 | 11/2001 | Tremblay et al. |
| 2002/0007443 A1 | 1/2002 | Gharachorloo et al. |
| 2002/0032725 A1 | 3/2002 | Araujo et al. |
| 2002/0038339 A1 | 3/2002 | Ku |
| 2002/0093954 A1 | 7/2002 | Weil et al. |
| 2002/0105972 A1 | 8/2002 | Richter et al. |
| 2002/0120488 A1 | 8/2002 | Bril et al. |
| 2002/0141343 A1 | 10/2002 | Bays |
| 2002/0158900 A1 | 10/2002 | Hsieh et al. |
| 2002/0165727 A1 | 11/2002 | Greene et al. |
| 2002/0169975 A1 | 11/2002 | Good |
| 2002/0191014 A1 | 12/2002 | Hsieh et al. |
| 2002/0194497 A1 | 12/2002 | Mcguire |
| 2002/0194584 A1 | 12/2002 | Suorsa et al. |
| 2003/0005090 A1 | 1/2003 | Sullivan et al. |
| 2003/0009552 A1 | 1/2003 | Benfield et al. |
| 2003/0055933 A1 | 3/2003 | Ishizaki et al. |
| 2003/0097428 A1 | 5/2003 | Afkhami et al. |
| 2003/0112749 A1 | 6/2003 | Hassink et al. |
| 2003/0123457 A1 | 7/2003 | Koppol |
| 2003/0149746 A1 | 8/2003 | Baldwin et al. |
| 2003/0152034 A1 | 8/2003 | Zhang et al. |
| 2004/0024869 A1 | 2/2004 | Davies |
| 2004/0116070 A1 | 6/2004 | Fishman et al. |
| 2005/0013310 A1 | 1/2005 | Banker et al. |

(56) References Cited

U.S. PATENT DOCUMENTS

| | | |
|---|---|---|
| 2005/0021713 A1 | 1/2005 | Dugan et al. |
| 2005/0063458 A1 | 3/2005 | Miyake et al. |
| 2005/0083936 A1 | 4/2005 | Ma |
| 2005/0175017 A1 | 8/2005 | Christensen et al. |
| 2005/0195741 A1 | 9/2005 | Doshi et al. |
| 2005/0259571 A1 | 11/2005 | Battou |
| 2005/0259634 A1 | 11/2005 | Ross |
| 2005/0262357 A1* | 11/2005 | Araujo ............... H04L 63/0227 713/182 |
| 2005/0262382 A1* | 11/2005 | Bain ..................... G06F 9/52 714/4.4 |
| 2005/0281192 A1 | 12/2005 | Nadeau et al. |
| 2006/0018266 A1 | 1/2006 | Seo |
| 2006/0095538 A1 | 5/2006 | Rehman et al. |
| 2006/0133300 A1 | 6/2006 | Lee et al. |
| 2006/0233107 A1 | 10/2006 | Croak et al. |
| 2006/0239201 A1 | 10/2006 | Metzger et al. |
| 2006/0262772 A1 | 11/2006 | Guichard et al. |
| 2006/0285500 A1 | 12/2006 | Booth, III et al. |
| 2007/0014231 A1 | 1/2007 | Sivakumar et al. |
| 2007/0021132 A1 | 1/2007 | Jin et al. |
| 2007/0041554 A1 | 2/2007 | Newman et al. |
| 2007/0061103 A1 | 3/2007 | Patzschke et al. |
| 2007/0147281 A1 | 6/2007 | Dale et al. |
| 2007/0165515 A1 | 7/2007 | Vasseur |
| 2007/0180104 A1 | 8/2007 | Filsfils et al. |
| 2007/0180105 A1 | 8/2007 | Filsfils et al. |
| 2007/0207591 A1 | 9/2007 | Rahman et al. |
| 2007/0220252 A1 | 9/2007 | Sinko |
| 2007/0263836 A1 | 11/2007 | Huang |
| 2007/0280102 A1 | 12/2007 | Vasseur et al. |
| 2008/0004782 A1 | 1/2008 | Kobayashi et al. |
| 2008/0034120 A1 | 2/2008 | Oyadomari et al. |
| 2008/0049622 A1 | 2/2008 | Previdi et al. |
| 2008/0074997 A1 | 3/2008 | Bryant et al. |
| 2008/0163291 A1 | 7/2008 | Fishman et al. |
| 2008/0225731 A1 | 9/2008 | Mori et al. |
| 2008/0247324 A1 | 10/2008 | Nadeau et al. |
| 2008/0253295 A1 | 10/2008 | Yumoto et al. |
| 2009/0016213 A1 | 1/2009 | Lichtwald |
| 2009/0019141 A1 | 1/2009 | Bush et al. |
| 2009/0046579 A1 | 2/2009 | Lu et al. |
| 2009/0046723 A1 | 2/2009 | Rahman et al. |
| 2009/0201799 A1 | 8/2009 | Lundstrom et al. |
| 2009/0201857 A1 | 8/2009 | Daudin et al. |
| 2009/0225650 A1 | 9/2009 | Vasseur |
| 2009/0232029 A1 | 9/2009 | Abu-Flamdeh et al. |
| 2009/0279440 A1 | 11/2009 | Wong et al. |
| 2010/0208922 A1 | 8/2010 | Emi et al. |
| 2010/0299319 A1 | 11/2010 | Parson et al. |
| 2011/0019550 A1 | 1/2011 | Bryers et al. |
| 2011/0063973 A1 | 3/2011 | VenkataRaman et al. |
| 2011/0170408 A1 | 7/2011 | Furbeck et al. |
| 2011/0185160 A1* | 7/2011 | Gaskins ............... G06F 11/364 712/216 |
| 2011/0224828 A1* | 9/2011 | Breznak ................ B25J 9/08 700/264 |
| 2012/0226673 A1* | 9/2012 | Li ....................... G06F 11/0712 707/704 |
| 2013/0028099 A1 | 1/2013 | Birajdar et al. |
| 2013/0086144 A1 | 4/2013 | Wu |
| 2013/0185767 A1 | 7/2013 | Tirupachur Comerica et al. |
| 2014/0149819 A1 | 5/2014 | Lu et al. |
| 2015/0063117 A1 | 3/2015 | Diburro et al. |
| 2016/0080239 A1* | 3/2016 | Buenrostro .......... H04L 43/10 709/224 |
| 2016/0378587 A1* | 12/2016 | Zhang ................. G06F 11/0757 714/55 |
| 2017/0192801 A1* | 7/2017 | Barlev ................. G06F 9/4555 |

FOREIGN PATENT DOCUMENTS

| | | |
|---|---|---|
| EP | 1861963 A2 | 12/2007 |
| EP | 1864449 A2 | 12/2007 |
| EP | 1891526 A2 | 2/2008 |
| EP | 1891526 B1 | 2/2012 |
| WO | 2006104604 A2 | 10/2006 |

OTHER PUBLICATIONS

"Configure the loopback Interface," retrieved from www.juniper.net/techpubs/soft- ware/iunos/junos56/index.html, Nov. 7, 2005, 2 pp.

"DARPA Internet Program Protocol Specification," Transmission Control Protocol, RFC 793, Sep. 1981, 90 pp.

"ICMP (Internet Control Message Protocol)," Data Network Resource, www.rhyshaden.com/icmp.html, last printed Nov. 10, 2005, 4 pp.

Kessler et al., "A Primer on Internet and TCP/IP Tools and Utilities," RFC 2151, Chapter 3.4: Traceroute, Nov. 9, 2005, pp. 9-11.

"Traceroute," Webopedia, http://www.webopedia.com/TERM/T/traceroute.html, Aug. 26, 2004, 1 p.

"Using the IP unnumbered configuration FAQ," APNIC, https://www.apnic.net/get-ip/faqs/ip-unnumbered, Jul. 1, 2005, 2 pp.

"Configure an Unnumbered Interface," www.juniper.net/techpubs/software/junos/junos56/index.html, last printed Nov. 7, 2005, 1 p.

Aggarwal et al., "Bidirectional Forwarding Detection (BFD) for MPLS Label Switched Paths (LSPs)," Internet Engineering Task Force (IETF), RFC 5884, Cisco Systems, Inc., Jun. 2010, 12 pp.

Aggarwal, "OAM Mechanisms in MPLS Layer 2 Transport Networks," IEEE Communications Magazine, Oct. 2004, pp. 124-130.

Atlas, "ICMP Extensions for Unnumbered Interfaces," draft-atlas-icmp-unnumbered-00, Dec. 9, 2005, 8 pp.

Atlas, "ICMP Extensions for Unnumbered Interfaces," draft-atlas-icmp-unnumbered-01, Feb. 2006, 8 pp.

Berkowitz, "Router Renumbering Guide," Network Working Group, RFC 2072, Jan. 1997, 41 pp.

Boney, "Cisco IOS in a Nutshell," 2nd Edition, published Aug. 2005, 16 pp.

Bonica et al., "Generic Tunnel Tracing Protocol (GTTP) Specification," draft-bonica- tunproto-01.txt, IETF Standard-Working-Draft, Internet Engineering Task Force, Jul. 2001, 20 pp.

Chapter 1: BFD Configuration Commands, Command Manual—BFD-GR, H3C S361 O&S551 0 Series Ethernet Switches, Version: 20081229-C-1.01, Release 5303, 2006-2008, 13 pp.

Chen et al., "Dynamic Capability for BGP-4," Network Working Group, Internet Draft, draft-ietf-idr-dynamic-cap-03.txt, Dec. 2002, 6 pp.

Fairhurst, "Internet Control Message protocol," Internet Control Protocol, (ICMP), retrieved from www.erg.abdn.ac.uk/users/gorry/course/inet-pages/icmp.html, Jan. 12, 2005, 3 pp.

H3C S3610 & S5510 Series Ethernet Switches (Version: 20081229-C-1.01, Release 5303, 2006-2008, Command Manual—BFD-GR), 2008, 13 pp.

Harmon, "32-Bit Bus Master Ethernet Interface for the 68030 (Using the Macintosh SE/30)," Apr. 1993, 10 pp.

Hegde et al., Multipoint BFD for MPLS, Network Working Group, Internet-Draft, draft- chandra-hedge-mpoint-bfd-for-mpls-00.txt, Mar. 5, 2012, 12 pp.

Katz et al., "BFD for Multipoint Networks", Network Working Group, Internet Draft, draft-ietf-bfd-multipoint-00.txt, Oct. 18, 2011, 29 pp.

Katz et al., "Biderectional Forwarding Detection (BFD) for Multihop Paths," Internet Engineering Task Force (IETF), RFC 5883, Jun. 2010, 6 pp.

Katz et al., "Bidirectional Forwarding Detection (BFD) for IPv4 and IPv6 (Single Hop)," Internet Engineering Task Force (IETF), RFC 5881, Juniper Networks, Jun. 2010, 7 pp.

Katz et al., "Bidirectional Forwarding Detection (BFD)," Internet Engineering Task Force (IETF), RFC 5880, Jun. 2010, 49 pp.

Katz et al., "Generic Application of Bidirectional Forwarding Detection (BFD)," Internet Engineering Task Force (IETF), RFC 5882, Jun. 2010, 17 pp.

Kolon, "BFD spots router forwarding failures," Network World, retrieved from www.networkworld.com/news/tech/2005/030705techupdate.html, Mar. 7, 2005, 3 pp.

(56) References Cited

OTHER PUBLICATIONS

Kompella et al., "Detecting Multi-Protocol Label Switched (MPLS) Data Plane Failures," Network Working Group, RFC 4379, Feb. 2006, 50 pp.

Kompella et al., Signalling Unnumbered Links in Resource ReSerVation Protocol-Traffic Engineering (RSVP-TE), Network Working Group, RFC 3477, Jan. 2003, 8 pp.

Mannie, "Generalized Multi-Protocol Label Switching Architecture," Network Working Group, Internet draft, draft-ieff-ccamp-gmpls-architecture-07.txt, May 2003, 56 pp.

Mukhi et al., "Internet Control Message Protocol ICMP," retrieved from www.vijaymukhi.com/vmis/icmp, Sep. 6, 2006, 5 pp.

Muller, "Managing Service Level Agreements," International Journal of Network Management, John Wiley & Sons, Ltd., May 1999, vol. 9, Issue 3, pp. 155-166.

Nadeau et al., "Bidirectional Forwarding Detection (BFD) for the Pseudowire Virtual Circuit Connectivity Verification (VCCV)," Internet Engineering Task Force (IETF), RFC 5885, Jun. 2010, 11 pp.

Nichols, et al., "Definition of the Differentiated Services Field (DS Field) in the IPv4 and IPv6 Headers," Network Working Group, RFC 2474, Dec. 1998, 19 pp.

Papavassiliou, "Network and service management for wide-area electronic commerce networks," International Journal of Network Management, John Wiley & Sons, Ltd., Mar. 2001, vol. 11, Issue 2, pp. 75-90.

Ramakrishnan et al.,"The Addition of Explicit Congestion Notification (ECN) to IP", RFC 3168, Sep. 2001, 63 pp.

Sangli et al., "Graceful Restart Mechanism for BGP," Network Working Group, Internet Draft, draft-ietf-idr-restart-06.txt, Jul. 2003, 10 pp.

Saxena et al., Detecting Data-Plane Failures in Point-to-Multipoint Mpls-Extensions to LSP Ping, RFC 6425, Internet Engineering Task Force (IETF), Nov. 2011, 28 pp.

Schmidt., "A Family of Design Patterns for Flexibly Configuring Network Services in Distributed Systems," Proceedings of the Third International Conference on Configurable Distributed Systems, May 6-8, 1996, IEEE Press, pp. 124-135.

Sun Hai-Feng, "Advanced TCP Port Scan and it's Response," O.L. Automation 2005, vol. 24, No. 4, China Academic Electronic Publishing House, Apr. 24, 2005, 2 pp. (English translation provided for abstract only).

Troutman, "DP83916EB-AT: High Performance AT Compatible Bus Master Ethernet Adapter Card," Nov. 1992, 34 pp.

Zvon, RFC 2072, [Router Renumbering Guide]—Router Identifiers, Chapter 8.3, Unnumbered Interfaces, www.zvon.org/tmRFC/RFC2072/output/chapter8.html , last printed on Nov. 7, 2005, 2 pp.

U.S. Appl. No. 15/018,669, by Juniper Networks, Inc. (Inventors: Addepalli et al.), filed Feb. 8, 2016.

U.S. Appl. No. 14/984,926, by Juniper Networks, Inc. (Inventors: Singh et al.), filed Dec. 30, 2015.

* cited by examiner

OFFLOADING HEARTBEAT RESPONSES MESSAGE PROCESSING TO A KERNEL OF A NETWORK DEVICE

TECHNICAL FIELD

This disclosure relates generally to computer networks, and more specifically, to heartbeat communications, such as communications used for liveliness detection, between devices in a computer network.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form.

Certain devices, referred to as routers, maintain routing information that describes available routes through the network. Each route defines a path between two locations on the network. Upon receiving an incoming packet, the router examines information within the packet and forwards the packet in accordance with the routing information. In order to maintain an accurate representation of a network, routers may maintain control-plane peering sessions through which they exchange routing or link state information that reflects the current topology of the network.

Periodic packets may be used to confirm liveliness. For example, periodic packets may be used to confirm connectivity and to indicate operational status of an application and/or device. Periodic packets may sometimes be referred to as "periodic messages," "keep-alives," "keep-alive packets," "keep-alive messages," "hellos," "hello packets," "hello messages," "heartbeats," "heartbeat packets," or "heartbeat messages."

As one example, routers typically send periodic packets to each other via the peering sessions to confirm connectivity and to indicate operational status of each device. The routers may use the periodic packets for network liveliness detection (e.g., to detect connectivity status with each other). For example, a router may send periodic packets to a peer router every 50 milliseconds (ms) to indicate that the router is still operational. Likewise, the router may detect reception of corresponding periodic packets from the peer router within the same period of time (e.g., 50 ms). When a periodic packet is not received in the allotted time frame, the router determines that a network event has occurred, such as failure of the peer router or failure of a link or node connecting the two routers. Consequently, the router may update various routing information to redirect network traffic and may issue a number of routing protocol update messages to neighboring routers indicating a topology change.

As another example, applications executing within a network environment frequently utilize heartbeat messaging schemes to monitor operational status of other applications within the network. For example, applications executing on network devices within a network environment may send periodic packets to each other to confirm connectivity and to indicate operational status of each device. For example, a first application executing on one network device may send periodic packets to a peer application executing on another network device every 50 milliseconds (ms) to indicate that the first application is still operational. Likewise, the application may detect reception of corresponding periodic packets from the peer application within the same period of time (e.g., 50 ms). When a threshold number of periodic packets have not been received in the allotted time frame, the application may determine that a session failure event has occurred, such as failure of the network device on which the peer application is executing or failure of a link or node connecting the two network devices or failure of the application itself. In response to the failure, the network device on which the peer application is executing may take certain actions, such as redirecting communications to a different peer application.

As another example, routers may exchange periodic packets by establishing a session provided by a protocol, such as the bidirectional forwarding detection (BFD) protocol. In accordance with the BFD protocol, a first router periodically sends BFD packets at a negotiated transmission time interval and detects a session failure event when the router does not receive a BFD packet from a second router within session detection time interval. For instance, a router may negotiate to receive BFD packets every 50 ms from a peer router and may independently utilize a detection multiplier of three (3) times that interval, i.e., 150 ms in this example, for detecting failure. If the receiving router does not receive a BFD packet from the peer router within the 150 ms session detection time interval, the receiving router detects a connectivity failure with respect to the second router. Consequently, the receiving router may update its routing information to route traffic around the second router.

SUMMARY

In general, one or more techniques of this disclosure may be directed to offloading the processing of heartbeat response messages to a kernel of a network device, reducing false alarms in network devices utilizing heartbeat messaging schemes and/or increasing performance in network devices utilizing heartbeat messaging schemes.

In one example, this disclosure describes a method comprising: receiving, by a first network device, a plurality of heartbeat response messages from one or more network devices of a plurality of network devices, wherein each heartbeat response message of the plurality of heartbeat response messages respectively corresponds to one network device of the plurality of network devices; processing, by the first network device, the plurality of heartbeat response messages in a kernel space of the first network device; updating, by the first network device in the kernel space, one or more values corresponding to a data structure based on processing the plurality of heartbeat response messages in the kernel space, wherein each value of the one or more values respectively corresponds to one network device of the plurality of network devices, and wherein each value of the one or more values is indicative of whether a heartbeat response message was received by the first network device from the respective one network device respectively corresponding to each value of the one or more values; and processing, by the first network device, the one or more values in a user space of the first network device.

In another example, this disclosure describes a network device comprising: one or more programmable processors coupled to a memory having instructions stored thereon that, when executed by the one or more programmable processors, cause the one or more programmable processors to: process a plurality of heartbeat response messages received from one or more network devices of a plurality of network devices in a kernel space, wherein each heartbeat response message of the plurality of heartbeat response messages respectively corresponds to one network device of the plurality of network devices; update, in the kernel space, one or more values corresponding to a data structure based on processing the plurality of heartbeat response messages in the kernel space, wherein each value of the one or more values respectively corresponds to one network device of the plurality of network devices, and wherein each value of the one or more values is indicative of whether a heartbeat response message was received from the respective one network device respectively corresponding to each value of the one or more values; and process the one or more values in a user space.

In another example, this disclosure describes an apparatus comprising: means for receiving a plurality of heartbeat response messages from one or more network devices of a plurality of network devices, wherein each heartbeat response message of the plurality of heartbeat response messages respectively corresponds to one network device of the plurality of network devices; means for processing the plurality of heartbeat response messages in a kernel space; means for updating, in the kernel space, one or more values corresponding to a data structure based on processing the plurality of heartbeat response messages in the kernel space, wherein each value of the one or more values respectively corresponds to one network device of the plurality of network devices, and wherein each value of the one or more values is indicative of whether a heartbeat response message was received from the respective one network device respectively corresponding to each value of the one or more values; and means for processing the one or more values in a user space.

In another example, this disclosure describes a method comprising: receiving, by a first network device, a heartbeat response message from a second network device; processing, by the first network device, the heartbeat response message in a kernel space of the first network device; updating, by the first network device in the kernel space, a value corresponding to a data structure based on processing the heartbeat response message in the kernel space, wherein the data structure includes a plurality of values with each value of the plurality of values respectively corresponding to one network device of a plurality of network devices, wherein the plurality of network devices includes the second network device, wherein the plurality of values includes the value corresponding to the second network device, and wherein each value of the plurality of values is indicative of whether a heartbeat response message was received by the first network device from the respective one network device respectively corresponding to each value of the plurality of values; and processing, by the first network device, the value corresponding to the second network device in a user space of the first network device.

In another example, this disclosure describes a first network device comprising: one or more programmable processors coupled to a memory having instructions stored thereon that, when executed by the one or more programmable processors, cause the one or more programmable processors to: process a heartbeat response message received from a second network device in a kernel space, wherein the heartbeat response message corresponds to the second network device; update, in the kernel space, a value corresponding to a data structure based on processing the heartbeat response message in the kernel space, wherein the data structure includes a plurality of values with each value of the plurality of values respectively corresponding to one network device of a plurality of network devices, wherein the plurality of network devices includes the second network device, wherein the plurality of values includes the value corresponding to the second network device, and wherein each value of the plurality of values is indicative of whether a heartbeat response message was received by the first network device from the respective one network device respectively corresponding to each value of the plurality of values; and process the value corresponding to the second network device in a user space of the first network device.

In another example, this disclosure describes an apparatus comprising: means for receiving a heartbeat response message from a first network device; means for processing the heartbeat response message in a kernel space; means for updating, in the kernel space, a value corresponding to a data structure based on processing the heartbeat response message in the kernel space, wherein the data structure includes a plurality of values with each value of the plurality of values respectively corresponding to one network device of a plurality of network devices, wherein the plurality of network devices includes the first network device, wherein the plurality of values includes the value corresponding to the first network device, and wherein each value of the plurality of values is indicative of whether a heartbeat response message was received from the respective one network device respectively corresponding to each value of the plurality of values; and means for processing the value corresponding to the first network device in a user space.

The details of one or more examples are set forth in the accompanying drawings and the description below. Other features, objects, and advantages of this disclosure will be apparent from the description and drawings, and from the claims.

DETAILED DESCRIPTION

Figure 1A:
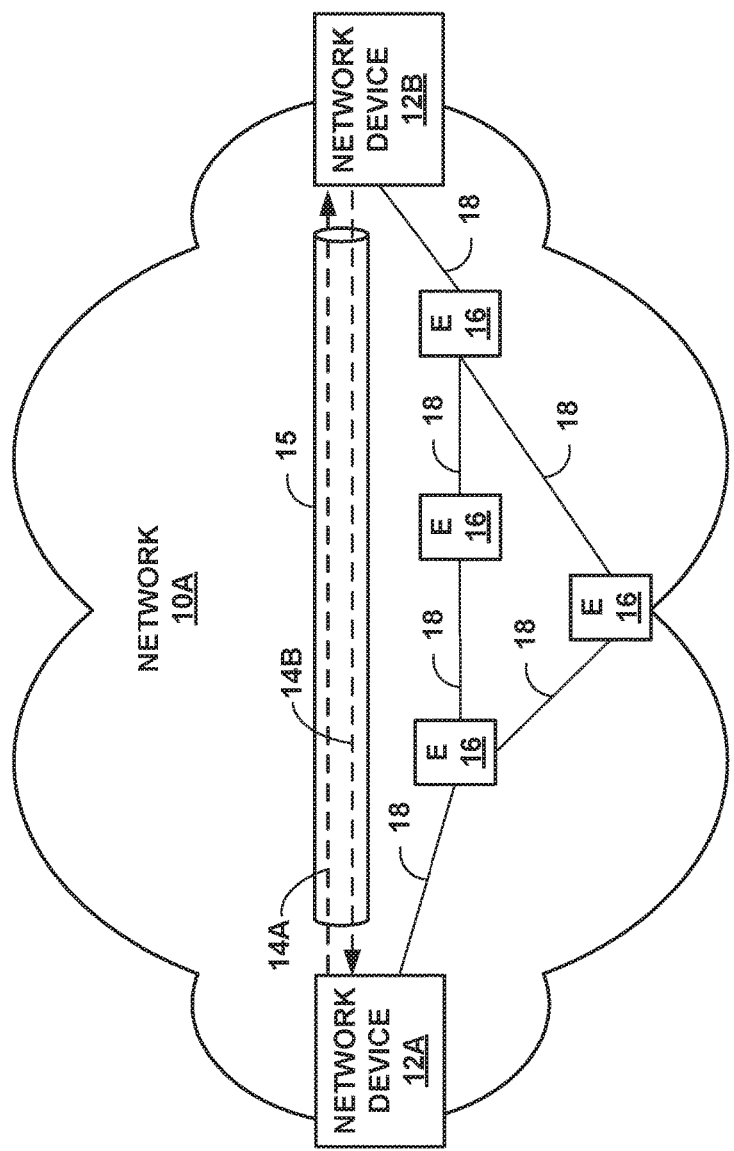
FIG. 1A is a block diagram illustrating an example network system in which techniques described herein may be implemented.

In general, one or more techniques of this disclosure may be directed to offloading the processing of heartbeat response messages to a kernel of a network device, reducing false alarms in network devices utilizing heartbeat messaging schemes and/or increasing performance in network devices utilizing heartbeat messaging schemes. For example, one or more techniques of this disclosure may be directed to a high precision heartbeat mechanism for checking the liveliness (e.g., health) of a plurality of nodes (e.g., network devices) from a node (e.g., a network device) different from the plurality of nodes. In some examples, the node different from the plurality of nodes may be referred to as a central node in a network environment (e.g., a highly scaled network environment). In other examples, the node different from the plurality of nodes may be referred to as a server node and the plurality of nodes may be referred to as client nodes in a network environment (e.g., a highly scaled network environment). In such examples, one or more client nodes themselves may be considered a server node to other nodes (e.g., one or more nodes of the plurality of nodes and/or nodes that are different from the plurality of nodes and the server node) in the network environment.

As used herein, the term "node" may refer to any network device. Similarly, the term "network device" may refer to any node in a network environment. It is therefore understood that the terms "node" and "network device" may be considered interchangeable in some examples. In some examples throughout this disclosure, the term "central node" may be used. It is understood that the term "central node" may refer to any node in a network environment that is configured to receive heartbeat messages from a plurality of other nodes in the network environment. It is therefore understood that the adjective "central" is not intended to convey that the central node has a central physical position in the network environment. For example, it is understood that a network environment may have more than one central node. In some examples, the term "central node" may refer to a "hub node" or "server node" to connote that a central, hub, or server node is in communication with a plurality of other nodes in a network environment. As used herein, the terms "data" and "information" may be synonymous in some examples.

Heartbeat messages described herein may or may not be periodic. In some examples, a heartbeat probe message may be periodically sent to one or more network devices. In other examples, a heartbeat probe message may not be periodically sent to one or more network devices.

Checking the liveliness of nodes may, for example, include performing a health check (e.g., a critical or non-critical health check) of the nodes. For example, as the number of heartbeat messages received by a node (e.g., a central node or a server node) increases, the node faces higher processing demands. As a result, processing heartbeat messages within timeliness requirements can be difficult, and if not met, may result in false alarms and/or decreased performance. For example, a node may issue a heartbeat probe message to a plurality of nodes. In response, the node may receive heartbeat response messages from the plurality of nodes (e.g., from healthy nodes of the plurality of nodes). However, generally coupled with a heartbeat probe message is a timeliness requirement that may, in some examples, define a time period during which a heartbeat response message must be received for the node corresponding thereto to be considered in good health or otherwise be considered to have responded to the heartbeat probe message. However, as the number of heartbeat response messages received by the node increases, the node may be unable to process all of the received heartbeat response messages within any applicable timeliness requirement(s) using conventional techniques. Failure to process a received heartbeat response message within any applicable timeliness requirement(s) may result in a false alarm (e.g., a false determination that a node is in bad health or otherwise in a state that it is unable to respond to a heartbeat probe message) for any node from which a heartbeat response message was received but not timely processed. It is understood that reference to "timeliness requirement(s)" refers to one or more timeliness requirements.

Accordingly, one or more techniques of this disclosure may be directed at enhancing the ability of a node to process multiple heartbeat response messages received from multiple nodes. For example, one or more techniques of this disclosure may be directed at enhancing the ability of a node to timely process a plurality of heartbeat response messages (e.g., tens, hundreds, thousands, or tens of thousands of heartbeat response messages) within any applicable heartbeat timeliness requirement(s). As described above, if a received heartbeat response message is not processed within any applicable timeliness requirement(s) associated therewith, the node that received the heartbeat response message may falsely determine that the node from which the heartbeat response message was received is in bad health (e.g., the node is offline, in a failure state, or the like) even though the heartbeat response message was in fact received.

In some examples, a central node may send out heartbeat probe message to a plurality of nodes in the network to perform a health check, and each node of the plurality of nodes that is able to reply back replies back with a heartbeat response message upon reception of such a heartbeat probe message from the central node. In such cases, the format of the heartbeat probe message(s) and/or the heartbeat response message(s) may be fixed. For example, the heartbeat probe message(s) and/or the heartbeat response message(s) may conform to a format defined by a heartbeat messaging protocol.

The heartbeat response messages received by the central node may inform the central node that the node from which the heartbeat response message was received is healthy and may not need to be interpreted further. In such examples, the central node may send one or more heartbeat probe messages over, for example, a multicast UDP socket. The multicasted heartbeat probe message may be received by a plurality of nodes in the network environment. In response to receiving a heartbeat probe message sent by the central node, a node may respond with a heartbeat response message of its own and transmit it to the central node. The central node may receive heartbeat response messages from the other nodes over the multicast UDP socket and mark such nodes as alive upon processing their respective heartbeat response messages within any applicable timeliness requirement(s). In some examples, if a heartbeat response message is not received and/or not processed by the central node within any applicable timeliness requirement(s), the central node may be configured to determine that any corresponding node from which a heartbeat response message is not received and/or not processed by the central node is unhealthy (e.g., dead). Similarly, if a heartbeat response message is received and processed by the central node within any applicable timeliness requirement(s), the central node may be configured to determine that any corresponding node from which a heartbeat response message is received and processed by the central node is alive or otherwise in good health.

In some examples, heartbeat messaging delay may be caused by one or more of the following: (1) an application on a node may be slow in responding with its heartbeat messages, (2) a kernel on a node may be slow in sending heartbeat messages, (3) a network over which a central node and other nodes communicate may be slow, (4), a kernel on the central node may be slow in receiving heartbeat response messages, or (5) an application on a central node may be slow in receiving heartbeat response messages. Failure to meet any applicable heartbeat message timeliness requirement(s) may be the result of any delay on any of these paths or locations in the heartbeat messaging path. However, even assuming in an example a situation where there are no delay points anywhere in the entire heartbeat messaging path, as the number of nodes probed for a health check by a central node increases, so too will the number of heartbeat response messages received by the central node. An increase in the number of heartbeat response messages received by the central node means that, according to conventional techniques, the central node will read the increased number of heartbeat response messages from one or more socket buffers and also process this increased number of heartbeat response messages by one or more applications on the central node in user space. In this example, even though there may be no issues anywhere in the heartbeat messaging network path (e.g., no issues anywhere, such as items (1)-(5) listed above, between the central node and any nodes to which a heartbeat probe message was sent), the increased scale of monitored (e.g., probed or health checked) nodes may cause delay on the receive side (i.e., at the central node) resulting in the detection of spurious node failures (e.g., spurious false alarms).

For example, a central node may be configured to monitor 10,000 to 20,000 (or less or more in other examples) nodes. In such an example, the number of heartbeat response messages received and stacked by the central node for processing is very high. In such an example, even though the central node may be functioning normally, the increased scale of servicing a high number of nodes results in a heavy load of heartbeat response message processing for the central node, which may cause processing delays of received heartbeat response messages. As described herein, failure to process a heartbeat response message within any applicable timeliness requirement(s) may cause the central node to spuriously determine that one or more nodes that actually sent a heartbeat response message to the central node (and was received by the central node) to be marked spuriously as unhealthy. For example, even though a heartbeat response message may be received by the central node, due to the number of other received heartbeat response messages, the central node may be unable to process the heartbeat response message within any applicable timeliness requirement(s) corresponding to, for example, the heartbeat message protocol. Accordingly, the central node may mark the node falsely despite having received the heartbeat response message corresponding thereto within any applicable timeliness requirement(s) associated with the heartbeat probe message.

One or more techniques described herein may reduce the processing load of processing the heartbeat response messages at the central node. For example, instead of one or more applications executing on the central node in user space processing received heartbeat response messages, the central node may be configured to process received heartbeat messages in kernel space. For example, the central node may be configured to generate a data structure, which may be referred to as a mapping data structure (e.g., mapping data structure 130) for the sake of clarity and explanation relative to other data structures described herein. In some examples, a mapping data structure may be generated in user space by an application. The application generating the mapping data structure may be the application that issued a heartbeat probe message to which heartbeat response messages have been received in response thereto. It is therefore understood that a mapping data structure may be application-specific, heartbeat probe message specific, specific to two or more heart beat probe messages (e.g., specific to a set of heartbeat probe messages), and the like. As one example, the central node may generate one or more mapping data structures depending on how many applications are issuing heartbeat probe messages. In such an example, if three applications running in user space on the central node issue their own respective heartbeat probe message(s), then the central node may generate three mapping data structures (e.g., one for each application).

The mapping data structure may correlate an index value to identification information of a node on a per node basis. It is understood that the mapping data structure may include one or more index values that respectively map to one or more nodes by respectively mapping the one or more index values to one or more pieces of node identification information (i.e., data representative of the one or more pieces of node identification information). The node identification information may be derived or otherwise be parsed from received heartbeat response messages. For example, a heartbeat response message sent from a node may include the source IP address (or more simply the IP address) of the node and/or additional identification information (e.g., port information and/or other information). As used herein, the term index value may refer to any value or data that is mapped to identification information of a node. For example, the index value may be referred to as a bit position, a bit number, a value, and the like. The mapping data structure itself may comprise a table, an array, or any other data structure having any other format. For example, the mapping data structure may, in some examples, be referred to as an index table that maps or otherwise correlates an index value to a node via identification information such as an IP address of the node.

In some examples, the mapping data structure may conceptually be described as a table with at least two columns. The first column may include a plurality of row entries with each row entry corresponding to an index value. Each index value may map or otherwise correlate to one or more pieces of identification information. For example, an index value may map to an IP address corresponding to a node. In such an example, a second column of the table in this particular example may include a plurality of row entries with each row entry corresponding to an IP address of a node. The node identification information (the IP address in this example) may be derived or otherwise be parsed from received heartbeat response messages. For example, a heartbeat response message sent from a node may include the source IP address (or more simply the IP address) of the node. Table I below illustrates one example of such a data structure:

TABLE I

| Index Value | Linear Array of Identification Information |
| --- | --- |
| 1 | IP Address of Node 1 |
| 2 | IP Address of Node 2 |
| ... | ... |
| 56 | IP Address of Node 56 |
| ... | ... |
| 1003 | IP Address of Node 1003 |
| ... | ... |
| n | IP Address of Node n |

In the example of Table I, it is understood that the mapping data structure may include one or more index values that map to one or more nodes by mapping the one or more index values to one or more pieces of node identification information. However, this particular example shows index values 1, 2, 56, 1003, and n, where n represents the nth index value. Each of index values 1, 2, 56, 1003, and n is shown as respectively mapping to Nodes 1, 2, 56, 1003, and n. More specifically, each of index values 1, 2, 56, 1003, and n is shown as respectively mapping to the IP Address of Node 1, the IP Address of Node 2, the IP Address of Node 56, the IP Address of Node 1003, and the IP Address of Node n. It is understood that the example of a mapping data structure illustrated with Table I is conceptual in that the IP addresses may be saved in memory locations accessible to the central node that are pointed to by each respective index value. For example, the mapping data structure may be implemented using a one-dimensional array (which may be referred to as a linear array) where the index values are pointers to each row or element of the identification information column. In other examples, the index values may constitute the bit position in the one-dimensional array. For example, IP address of node 1 may be described as being in the first bit position of the array, the IP address of node 2 may be described as being in the second bit position of the array, the IP address of node 56 may be described as being in bit position number 56 of the array, the IP address of node 1003 may be described as being in bit position 1003 of the array, and the IP address of node n may be described as being in the nth bit position of the array.

In some examples, the mapping data structure may conceptually be described as a table with at least three columns. The first column may include a plurality of row entries with each row entry corresponding to an index value. Each index value may map or otherwise correlate to two or more pieces of identification information. For example, an index value may map to an IP address and a port number corresponding to a node. In such an example, a second column of the table in this particular example may include a plurality of row entries with each row entry corresponding to an IP address of a node, and a third column of the table in this particular example may include a plurality of row entries with each row entry corresponding to a port number of a node. The node identification information (the IP address and port number in this example) may be derived or otherwise be parsed from received heartbeat response messages. For example, a heartbeat response message sent from a node may include the source IP address (or more simply the IP address) of the node and a port number of the node identified in the heartbeat response message. Table II below illustrates one example of such a data structure:

TABLE II

| Index Value | Identification Information #1 | Identification Information #2 |
|---|---|---|
| 1 | IP Address of Node 1 | Port Number of Node 1 |
| 2 | IP Address of Node 2 | Port Number of Node 2 |
| ... | ... | ... |
| 56 | IP Address of Node 56 | Port Number of Node 56 |
| ... | ... | ... |
| 1003 | IP Address of Node 1003 | Port Number of Node 1003 |
| ... | ... | ... |
| n | IP Address of Node n | Port Number of Node n |

In the example of Table II, it is understood that the mapping data structure may include one or more index values that map to one or more nodes by mapping the one or more index values to two or more pieces of node identification information. However, this particular example shows index values 1, 2, 56, 1003, and n, where n represents the nth index value. Each of index values 1, 2, 56, 1003, and n is shown as respectively mapping to Nodes 1, 2, 56, 1003, and n. More specifically, each of index values 1, 2, 56, 1003, and n is shown as respectively mapping to (1) the IP Address of Node 1, the IP Address of Node 2, the IP Address of Node 56, the IP Address of Node 1003, and the IP Address of Node n; and (2) the port number of Node 1, the port number of Node 2, the port number of Node 56, the port number of Node 1003, and the port number of Node n. It is understood that the example of a mapping data structure illustrated with Table II is conceptual in that the IP addresses and Port numbers may be saved in memory locations accessible to the central node that are pointed to by each respective index value. For example, the mapping data structure may be implemented using a one-dimensional array (which may be referred to as a linear array) where the index values are pointers to each row or element of the identification information column. In such an example, the IP address and the port number for each node may be concatenated such that a single linear array may be used. For example, each entry of the array may include data corresponding to the IP address concatenated with data corresponding to the port number.

As described above, the central node may be configured to generate a mapping data structure. The mapping data structure may correlate an index value to identification information of a node on a per node basis. The central node uses the index values of this mapping data structure in kernel space. In some examples, the central node may copy the mapping data structure to kernel space, meaning that the mapping data structure generated in user space is either copied or otherwise made accessible to kernel space. In other examples, the central node may communicate the bit positions corresponding to the mapping data structure in user space to kernel space using on a per heartbeat response message basis using a registration message, which is described herein in more detail.

In some examples, the central node uses the index values of a mapping data structure in kernel space for the generation of a data structure indicative of heartbeat response message reception, which may be referred to as a health check data structure (e.g., health check data structure 134) for the sake of clarity and explanation relative to other data structures described herein. A health check data structure may be generated in kernel space. The health check data structure may correlate an index value to a value. The value may be referred to as a heartbeat response message reception value since the value is indicative of whether a heartbeat response message was received by the central node from the node corresponding to the index value. A heartbeat response message reception value may, in some examples, be a 1-bit value. For example, a value of 0 may indicate that a heartbeat response message from a node was not received, and a value of 1 may indicate that a heartbeat response message from the node was received. In other examples, the heartbeat response message reception value may be one or more bits.

The index values for the health check data structure and the mapping data structure are the same. However, the data mapped to each index value is different. For example, the mapping data structure correlates an index value to identification information of a node on a per node basis, whereas the health check data structure correlates an index value to a heartbeat response message reception value. As another example, the mapping data structure may include one or more index values that respectively map to one or more nodes by respectively mapping the one or more index values to one or more pieces of node identification information, whereas the health check data structure may include the same one or more index values but the one or more index values respectively map to one or more heartbeat response message values instead of one or more pieces of node identification information. For example, the index value corresponding to each node may include a heartbeat response message reception value indicative of whether a heartbeat message was received by the central node from each node corresponding to each respective index value. In some examples, the default value for each reception value may be a 0. For example, if the central node is monitoring the health of 10 nodes, a health check data structure may include 10 different index values mapping to 10 reception values having a default value of 0, where one index value may uniquely correspond to each node. In this example, if the central node receives 9 heartbeat response messages from a heartbeat probe message sent to the 10 nodes, the central node may be configured to set the heartbeat response message reception value corresponding to 9 of the 10 index values to a value of 1 to indicate that a heartbeat response message was received from the 9 nodes corresponding to the 9 index values for which a reception value was changed to 1. The mapping data structure and the health check data structure are discussed in more detail below.

The health check data structure itself may comprise a table, an array, or any other data structure having any other format. For example, the health check data structure may, in some examples, be referred to as a bit-map that maps or otherwise correlates an index value to a heartbeat response message reception value. In some examples, the health check data structure may conceptually be described as a table with two columns. The first column may include a plurality of row entries with each row entry corresponding to an index value. Each index value may map or otherwise correlate to one or more heartbeat response message reception values. For example, an index value may map to a heartbeat response message reception value corresponding to a node. In such an example, a second column of the table in this particular example may include a plurality of row entries with each row entry corresponding to a heartbeat response message reception value of a node. The heartbeat response message reception value may be derived as described herein. Table III below illustrates one example of such a data structure:

TABLE III

| Index Value | Linear Array of Reception Values |
|---|---|
| 1 | Heartbeat Response Message Reception Value 1 |
| 2 | Heartbeat Response Message Reception Value 2 |
| ... | ... |
| 56 | Heartbeat Response Message Reception Value 56 |
| ... | ... |
| 1003 | Heartbeat Response Message Reception Value 1003 |
| ... | ... |
| n | Heartbeat Response Message Reception Value n |

In the example of Table III, it is understood that the health check data structure may include one or more index values that respectively map to one or more heartbeat response message values. However, this particular example shows index values 1, 2, 56, 1003, and n, where n represents the nth index value. Each of index values 1, 2, 56, 1003, and n is shown as respectively mapping to heartbeat response message reception values 1, 2, 56, 1003, and n. It is understood that the example of a health check data structure illustrated with Table III is conceptual. For example, the health check data structure may be implemented using a one-dimensional array (which may be referred to as a linear array) where the index values are pointers to each row or element of the identification information column. In other examples, the index values may constitute the bit position in the one-dimensional array. For example, an array of [A, B, C, D] can be described as having four bit positions. In this example, the value of A is in the first bit position, the value of B is in the second bit position, the value of C is in the third bit position, and the value of D is in the fourth bit position. Accordingly, it is understood that in some examples, the bit positions for the health check data structure and the mapping data structure are the same, meaning that the same bit positions in both data structures refer to information corresponding the same network device. The look-up data structure described herein may enable or otherwise ensure that the values stored in a health check data structure are stored in the appropriate bit position of the health check data structure. Accordingly, as described in more detail herein, an application is configured to receive a linear array of heartbeat response message reception values (i.e., the health check data structure) from kernel space (e.g., from heartbeat handler 103). Since the bit positions are the same for the health check data structure and the mapping data structure, the application is configured to traverse each bit position of the linear array of heartbeat response message reception values, and determine which network device corresponds to each heartbeat response message reception value by using the same bit position in the mapping data structure.

FIG. 1A is a block diagram illustrating an example network system 10A in which techniques described herein may be implemented. In this example, network system 10A includes network devices 12A, 12B ("network devices 12"), which operate and interact with one another in accordance with the techniques described herein. As used herein, the term network device may refer to any network node, whether or not an intermediate network device. For example, network devices 12 may be synonymously referred to as nodes 12 or network nodes 12.

Network devices 12 are communicatively coupled to one another, either directly, or indirectly, via one or more intermediate network elements 16 ("E") interconnected by wired or wireless links 18. Intermediate network elements 16 may be more simply referred to as network elements 16 with the understanding that network elements 16 are intermediate network elements. As used herein, the term intermediate network element may refer to any intermediate network node. For example, intermediate network elements 16 may be synonymously referred to as nodes 16, network nodes 16, intermediate nodes 16, or intermediate network nodes 16. Network elements 16 may, for example, be routers, switches, gateways, firewalls, and the like. Links 18 represent any physical medium, such as a copper wire, a coaxial cable, any of a host of different fiber optic lines, a wireless connection, and various combinations thereof.

In general, network devices 12 execute applications that send status messages (e.g., heartbeat probe messages) to one another in order to monitor operational and connectivity status of each other. That is, by sending one or more heartbeat probe messages and detecting receipt of heartbeat response messages, network devices 12 detect any failures, either as a result of failure of one or more of network devices 12, network elements 16 or of links 18 between them. Upon detecting such a failure, the detecting network device 12 takes certain actions, such as redirecting communications to a different peer application. Network devices 12 may be end-user computers, desktops, laptops, mobile devices, servers, virtual machines or networking infrastructure, such as routers, switches, gateways, firewalls, or other network-enabled devices.

In the example of FIG. 1A, an application executing on network device 12A may be configured to establish a communication session 15, such as a Transmission Control Protocol (TCP) session, with network device 12B and transmits heartbeat probe messages 14A to network device 12B over the communication session. In other examples, an application executing on network device 12A may be configured to transmit heartbeat probe messages 14A to network device 12B using a sessionless protocol, such as a User Datagram Protocol (UDP). When transmitted, heartbeat probe messages 14A are first processed by transmit hardware/software on network device 12A (e.g., kernel software including network stack software, interface drivers and network interface hardware), processed by hardware/software of intermediate network elements 16 (e.g., packet forwarding ASICs, switch fabrics, packet queues of the network elements) when transporting the packets, and ultimately processed by receive hardware/software of network device 12B.

In response, network device 12B transmits heartbeat response messages 14B on communication session 15. That is, upon receiving a heartbeat probe message 14A, network device 12B constructs a respective heartbeat response message 14B and outputs the response packet to network device 12A over the communication session. Heartbeat response message 14B are, therefore, processed by transmit hardware/software on network device 12B when transmitting the packet, processed by hardware/software of network elements 16 (e.g., packet forwarding ASICs, switch fabrics, packet queues) when transporting the packets and ultimately processed by receive hardware/software of network device 12A.

In operation, network device 12A may implement a transmission (or "transmit") timer that controls transmission of heartbeat probe messages 14A over the communication session. In such examples, the transmit timer measures intervals for network device 12A to transmit a heartbeat probe message 14A over the communication session, and triggers transmission of the packet upon reaching the negotiated interval. In some examples, the transmit timer may cause network device 12A to send a heartbeat probe message two or more times within a single time interval. In other examples, the transmit timer may cause network device 12A to send a heartbeat probe message two or more times within each time interval of a plurality of time intervals. For example, network device 12A may be configured to periodically send a heartbeat probe message 3 times within 5 seconds and reinitiate (or not reinitiate in other examples) the timer upon expiring.

Network device 12A may implement a detection timer to monitor receipt of heartbeat response messages 14B. The detection timer may define at least one timeliness requirement associated with one or more heartbeat probe messages. For example, the detection timer may measure intervals between received heartbeat probe messages 14B over the communication session. Using the detection timer, network device 12A determines the operational status of network device 12B, i.e., whether network device 12B is operational and in communication.

For instance, if network device 12A does not receive a heartbeat response message 14B before the detection timer elapses, the network device determines that a network event has occurred that is preventing communication, such as a failure of an intermediate link 18 or network element 16 or failure of hardware and/or software of network device 12B. As another example, if network device 12A does receive a heartbeat response message 14B within the session detection time (e.g., before the detection time expires) but fails to process the heartbeat response message 14B within the session detection time (e.g., before the detection time expires) resulting in the network device not knowing that it actually received the heartbeat response message 14B, the network device spuriously determines that a network event has occurred that is preventing communication, such as a failure of an intermediate link 18 or network element 16 or failure of hardware and/or software of network device 12B. In many instances, network device 12A sets the detection timer to a multiple (e.g., an integer multiple) of the negotiated transmit interval, such as a value of 3*Transmit Interval. For example, if the transmit interval is being used by network device 12A is 50 ms, network device 12A may determine a failure has occurred if no heartbeat response message 14B is received in 150 ms, i.e., three (3) transmit intervals.

In some examples, network device 12B may conceptually represent multiple network devices. In such examples, network device 12A may represent a network device (e.g., a centralized network device) that is directly communicatively coupled (e.g., without one or more intermediate network elements) or indirectly communicatively coupled (e.g., with one or more intermediate network elements) to multiple network devices.

Figure 1B:
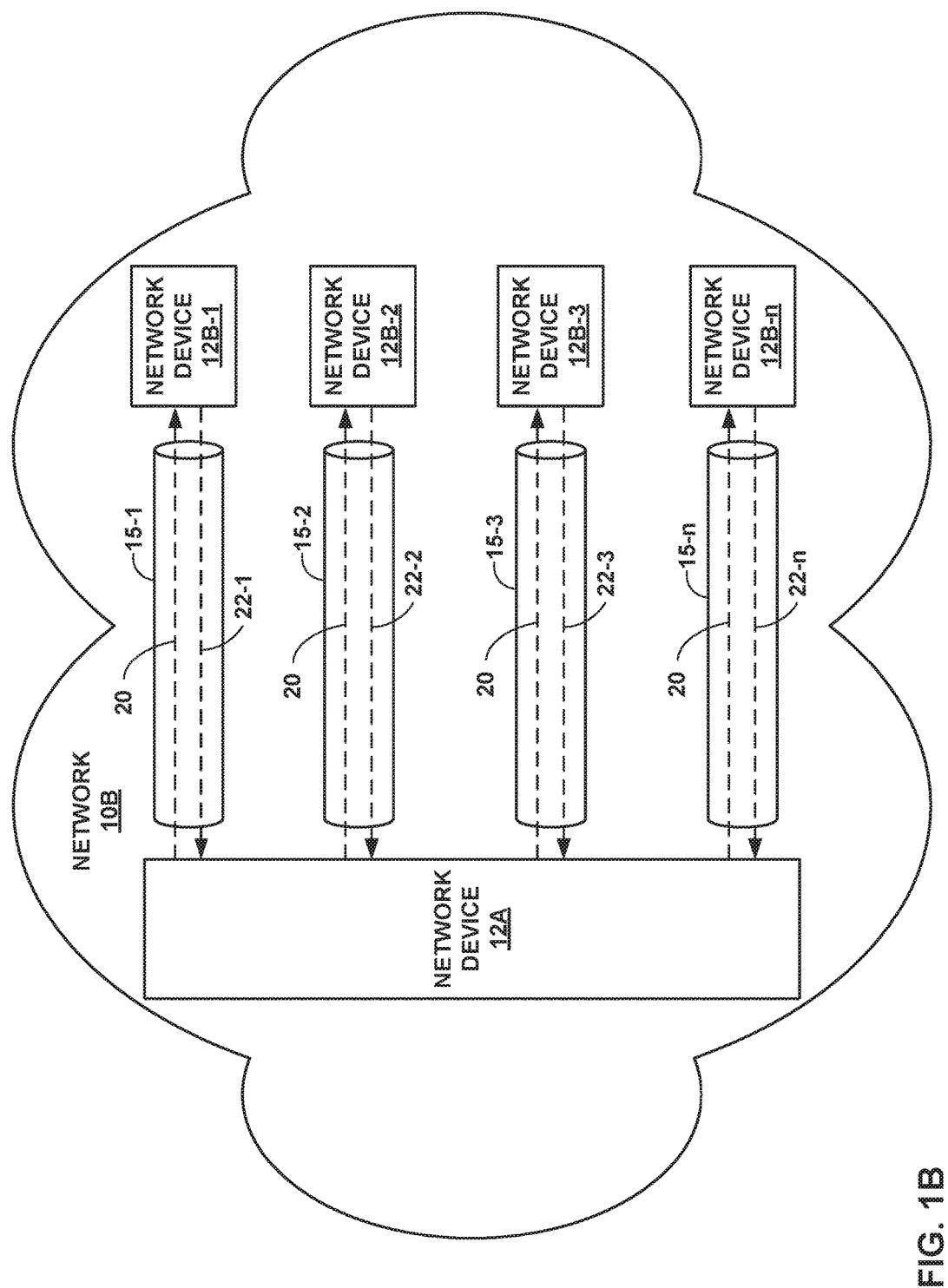
FIG. 1B is a block diagram illustrating an example network system in which techniques described herein may be implemented.

FIG. 1B illustrates a block diagram illustrating an example network system 10B in which techniques described herein may be implemented. In this example, network system 10B includes network devices 12A, 12B-1, 12B-2, 12B-3, and 12B-n (collectively, 12B-1 through 12B-n) where n represents the nth network device. Network device 12A may be directly communicatively coupled to one or more of network devices 12B-1 through 12B-n and/or indirectly communicatively coupled to one or more of network devices 12B-1 through 12B-n. Each of network devices 12B-1 through 12B-n may operate and interact with network device 12A in the manner described with respect to network device 12B described herein. For example, each of network devices 12B-1 through 12B-n may be configured to receive a heartbeat probe message from network device 12A. Network device 12A may unicast, broadcast, or multicast the heartbeat probe message such that each of network devices 12B-1 through 12B-n is destined to receive the heartbeat probe message. In the event of receiving the heartbeat probe message, each of network devices 12B-1 through 12B-n may be configured to transmit a heartbeat response message in response to receiving the heartbeat probe message.

Network device 12A may be a central network device communicably coupled to multiple network devices (e.g., network devices 12B-1 through 12B-n). In some examples, none of network devices 12B-1 through 12B-n may be a central network device communicably coupled to multiple network devices. In other examples, one or more network devices 12B-1 through 12B-n may be a central network device communicably coupled to multiple network devices as well.

In the example of FIG. 1B, one or more applications executing on network device 12A may be configured to establish a communication session with each of network devices 12B-1 through 12B-n. As used herein, reference to establishing a communication session may refer to establishing a session-based (e.g., TCP) communication session or a sessionless (e.g., UDP) communication session. It is similarly understood that, as used herein, a communication session may refer to a session-based (e.g., TCP) communication session or a sessionless (e.g., UDP) communication session. For example, FIG. 1B illustrates communication sessions 15-1, 15-2, 15-3, and 15-n where n represents the nth communication session for the nth network device 12B-n. Each of communication sessions 15-1 through 15-n may be established and utilized in a manner in which session-based and/or sessionless communication sessions operate. It is understood that each of communication sessions 15-1 through 15-*n* represents one or more communication sessions established between the illustrated network devices.

Network device 12A may be configured to transmit (e.g., via a unicast, broadcast, and/or multicast messaging protocol) a heartbeat probe message 20 to each of network devices 12B-1 through 12B-n. In response to receiving the heartbeat probe message 20, each of network devices 12B-1 through 12B-n may be configured to respectively transmit heartbeat response messages 22-1, 22-2, 22-3, and 22-*n*. For example, upon receiving heartbeat probe message 20, network device 12B-1 constructs heartbeat response message 22-1 and outputs the response packet to network device 12A. As another example, upon receiving heartbeat probe message 20, network device 12B-2 constructs heartbeat response message 22-2 and outputs the response packet to network device 12A. As another example, upon receiving heartbeat probe message 20, network device 12B-3 constructs heartbeat response message 22-3 and outputs the response packet to network device 12A. As another example, upon receiving heartbeat probe message 20, network device 12B-n constructs heartbeat response message 22-*n* and outputs the response packet to network device 12A.

In operation, network device 12A may implement a transmission (or "transmit") timer that controls transmission of heartbeat probe messages 20 over network 10B to one or more other network devices (e.g., network devices 12B-1 through 12B-n). In such examples, the transmit timer may measure one or more intervals for network device 12A to transmit a heartbeat probe message 20, and trigger transmission of the packet upon reaching the negotiated interval(s). In some examples, the transmit timer may cause network device 12A to send a heartbeat probe message two or more times within a single time interval. In other examples, the transmit timer may cause network device 12A to send a heartbeat probe message two or more times within each time interval of a plurality of time intervals. For example, network device 12A may be configured to periodically send a heartbeat probe message 3 times within 5 seconds and reinitiate (or not reinitiate in other examples) the timer upon expiring.

Network device 12A may implement a detection timer to monitor receipt of heartbeat response messages received from network devices 12B-1 through 12B-n. Using the detection timer, network device 12A determines the operational status of each of network devices 12B-1 through 12B-n. For instance, if network device 12A does not receive a heartbeat response message from one or more of network devices 12B-1 through 12B-n within the session detection time, network device 12A determines that a network event has occurred that is preventing communication, such as a failure of an intermediate link 18 or network element 16 or failure of hardware and/or software of the one or more network devices 12B-1 through 12B-n from which a heartbeat response message was not received. As another example, if network device 12A does receive a heartbeat response message from each of the network devices 12B-1 through 12B-n within the session detection time but fails to process one or more of the received heartbeat response messages within the detection time, network device 12A spuriously determines that a network event has occurred that is preventing communication with the one or more network devices 12B-1 through 12B-n from which a heartbeat response message was received but not processed within the timeliness requirement (e.g., the detection time interval). In many instances, network device 12A sets the detection timer to a multiple (e.g., an integer multiple) of the negotiated transmit interval, such as a value of 3*Transmit_Interval. For example, if the transmit interval is being used by network device 12A is 50 ms, network device 12A may determine a failure has occurred if no heartbeat response message is received in 150 ms, i.e., three (3) transmit intervals, from a network device to which a heartbeat probe message was sent.

The techniques described herein may be implemented by any network device. However, it is understood that the techniques described herein may be generally more beneficial to a node (e.g., a network device communicably coupled, whether directly or indirectly, to multiple network devices). It is similarly understood that the techniques described herein may generally become more beneficial to a node as the number nodes with which a communication session is established increases. It is similarly understood that the techniques described herein may generally become more beneficial to a node as the number nodes from which heartbeat response messages are received increases. For example, as the number of heartbeat messages received by a node increases, so too may any benefit(s) accruing from one or more techniques described herein. As another example, while the techniques described herein may apply to heartbeat messaging schemes that utilize unicast, broadcast, or multicast techniques, it is understood that the benefit(s) accruing from one or more techniques described herein may be realized least in a unicast messaging scheme, more in a broadcast messaging scheme, and most in a multicast messaging scheme. As yet another example, while the techniques described herein may apply to heartbeat messaging schemes that utilize TCP sessions and/or UDP sessions, it is understood that the benefit(s) accruing from one or more techniques described herein may be realized more in UDP sessions since UDP is used for multicasting. Accordingly, the techniques described herein may enable an efficient and scalable way of processing heartbeat messages received by a node from a plurality of other nodes. For example, the techniques described herein may enable an efficient and scalable way of reducing and/or eliminating false alarms (e.g., spurious determinations that a heartbeat message was not received) caused by the inability of a node to process received heartbeat messages within any timeliness requirements. As another example, the techniques described herein may enable an efficient and scalable way of increasing the performance of a node by changing how received heartbeat messages are processed by the node. In such examples, received heartbeat messages may be processed in kernel space instead of in user space.

The techniques described above with respect to FIGS. 1A and 1B, may be applied to a variety of network protocols that utilizes heartbeat messages for indicating operational and connectivity status to a peer device. One exemplary protocol is referred to as the bidirectional forwarding detection (BFD) protocol, which is commonly used between two network devices in order for each router to closely monitor the state (e.g., health) of the other device. For example, network devices 12 (e.g., any of network devices 12A, 12B, 12B-1, 12B-2, 12B-3, and 12B-n) may establish a BFD session for sending and responding to status inquiries in the form of Hello packets, either asynchronously or when needed (e.g., as in the BFD Demand Mode). In either case, the BFD protocol provides a very short interval of time between which network devices 12 must transmit heartbeat messages, and thus may facilitate the quicker detection of failures by network devices 12 that are in an active BFD session. Further example details of the BFD protocol are described in D. Katz, D. Ward, Bidirectional Forwarding Detection, June 2010, the entire contents being incorporated herein by reference.

Figure 2:
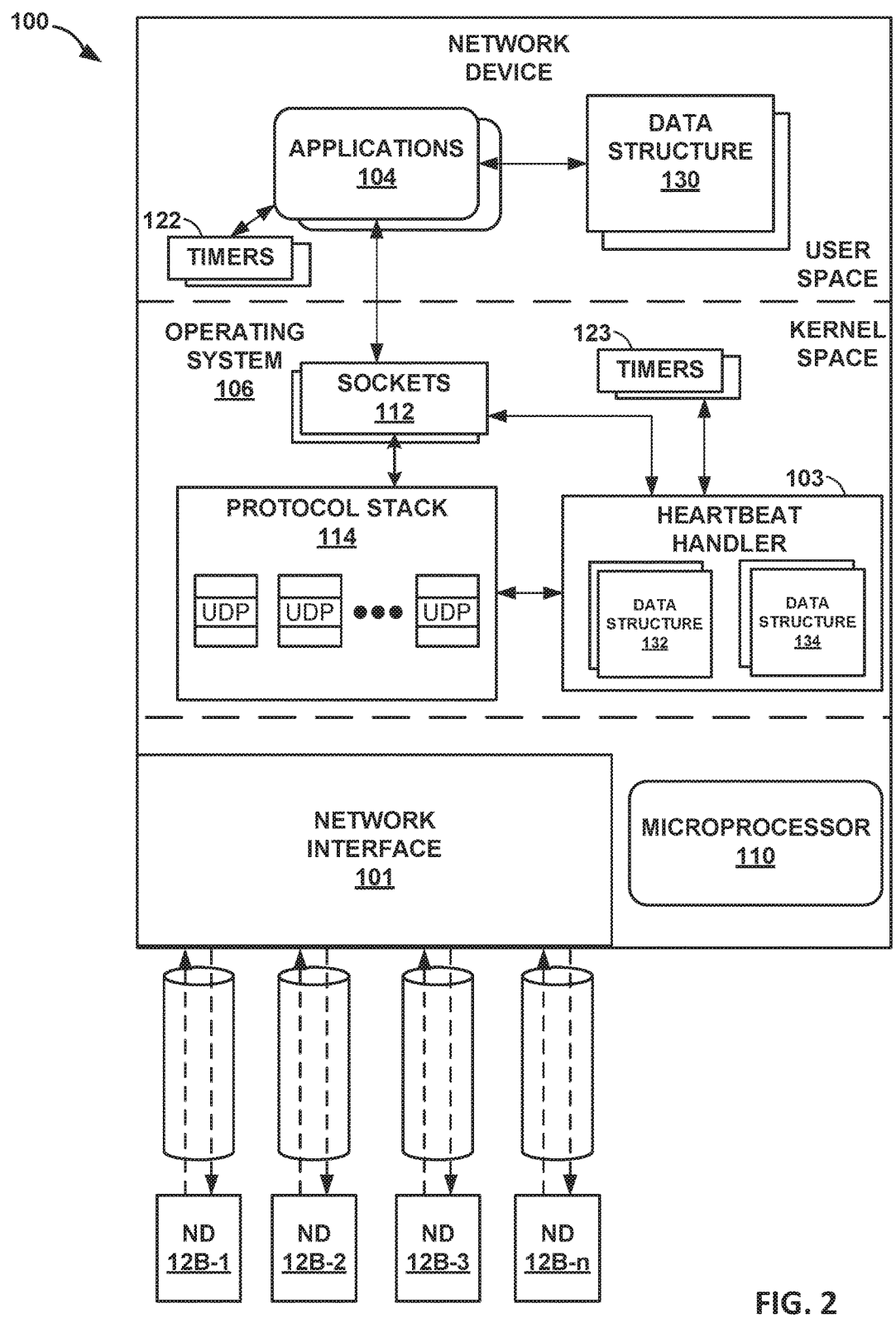
FIG. 2 is a block diagram illustrating an exemplary network device in accordance with the disclosure herein.

FIG. 2 is a block diagram illustrating an example network device 100 that provides an operating environment for one or more applications 104. For example, network device 100 may represent any of network devices 12A, 12B, any of network devices 12B-1 through 12B-n of FIGS. 1A and 1B, and/or any central node described herein.

In this example, network device 100 includes a network interface 101 to send and receive network packets. In addition, network device 100 includes a microprocessor 110 (which may be referred to as a processing unit 110 or a processor 110) executing operating system 106 to provide an execution environment for one or more applications 104 in user space that communicate with other network devices over a packet-based network. In general, applications 104 may represent any component of a network device that utilizes heartbeat messages to communicate with one or more other network devices. Network device 100 may be any network device, such as any network device configured to provide network operations (e.g., a router, a switch, a firewall, an intrusion detection system, a network cache, or a DNS server). Example applications 104 include routing protocol applications, device management applications, such as BFD, SNMP or NETCONF, or the like.

In the example of FIG. 2, operating system 106 executing within the kernel space of network device 100 implements kernel-level processes for handling data at various layers of the open systems interconnection (OSI) networking model (shown as protocol stack 114). Operating system 106 provides an API by which applications 104 creates one or more sockets 112 and establishes, for example, TCP/IP-based communication sessions for sending and receiving messages (e.g., heartbeat messages) for one or more sockets 112. As another example, operating system 106 provides an API by which applications 104 creates one or more sockets 112 and establishes, for example, UDP/IP-based communication sessions for sending and receiving messages (e.g., heartbeat messages) for each socket. As described herein, network device 100 may be configured to monitor one or more other network devices using a heartbeat messaging protocol. In some examples, one or more sockets may include one or more raw sockets and/or one or more UDP sockets. For example, in accordance with the techniques of this disclosure, each application 104 that issues one or more heartbeat probe messages may open or otherwise create one or more sockets 112. As an example, an application 104 may open a first socket (e.g., a UDP socket) and a second socket (e.g., a raw socket). An application may use the first socket (e.g., a UDP socket) to read packets (e.g., UDP packets) from protocol stack 114, and may use the second socket (e.g., a raw socket) for reading information from kernel space and writing information to kernel space.

In some examples, sockets 112 may be described as logical constructs having data structures (e.g., data buffers) and state data maintained by operating system 106 and may be viewed as acting as interfaces between applications 104 and protocol stack 114. For instance, sockets 112 may include one or more data structures that define data relating to one or communication sessions, such as a file descriptor of a socket, a thread identifier of the socket, an active/backup state of the socket, and a pointer to a TCP or UDP socket within protocol stack 114. Sockets are used herein as one common mechanism for establishing communication sessions between network devices and the techniques described herein may be applied to any other type of communication session that utilizes heartbeat messages. For example, sockets are used herein as one exemplary way for establishing communication sessions between processes (e.g., applications) running in user space of network device 100 and processes running in kernel space of network device 100.

In the example of FIG. 2, an application 104 may generate one or more heartbeat probe messages destined for one or more other network devices. Conventionally, network device 100 would be configured to send the one or more heartbeat probe messages to the one or more network devices, receive one or more heartbeat response messages from the one or more other network devices, and the application 104 that issued the one or more heartbeat probe messages would then read the received one or more heartbeat response messages from a receive buffer over a socket 112 and process the one or more heartbeat response messages in user space. However, as the number of heartbeat response messages increases, the application 104 that issued the one or more heartbeat probe messages may not be quick enough to process each received heartbeat response message within any applicable timeliness requirement(s) associated with the heartbeat probe message. One or more techniques described herein reduces the processing load for the application 104 by, for example, shifting the processing of heartbeat response messages from the user space of network device 100 to the kernel space of network device 100.

For example, to shift the processing of heartbeat response messages from the user space of network device 100 to the kernel space of network device 100, network device 100 may be configured with heartbeat handler 103. In some examples, heartbeat handler 103 may be software running in kernel space of network device 100. Heartbeat handler 103 may be configured to transmit information to user space and receive information from user space using one or more sockets 112. Similarly, one or more applications 104 may be configured to transmit information to kernel space and receive information from kernel space using one or more sockets 112. For example, heartbeat handler 103 may be configured to communicate with one or more applications 104 via one or more sockets 112. As one example, an application 104 may be configured to write data to a raw socket (e.g., a buffer of the raw socket) that may be read by heartbeat handler 103 over the raw socket. Heartbeat handler 103 may similarly be configured to write data to the raw socket (e.g., a buffer of the raw socket) that may be read by the application 104 over the raw socket. An application 104 may be configured to read packets (e.g., UDP packets) from protocol stack 114 over a socket, such as a UDP socket.

Heartbeat handler 103 may be configured to generate a first data structure 134 and a second data structure 132 in kernel space. In some examples, the first data structure 134 may be referred to as a health check data structure 134 and the second data structure 132 may be referred to as a look-up data structure 132 for the sake of clarity and explanation relative to other data structures described herein. Heartbeat handler 103 may be configured to generate the health check data structure 134 and/or the look-up data structure 132 on a per heartbeat probe message basis, per heartbeat probe message set basis (where a set of heartbeat probe messages is defined as two or more heartbeat probe messages), per timer basis, and/or per application basis. For example, a first application of applications 104 may transmit a first heartbeat probe message destined for 1,000 network devices and a second heartbeat probe message destined for 4,000 network devices, and a second application of applications 104 may transmit a heartbeat probe message destined for 9,000 network devices. In these three examples, heartbeat handler 103 may be configured to (1) generate a first health check data structure and/or a first look-up data structure corresponding to the first heartbeat probe message issued by the first application based on a first wave of heartbeat response messages sent in response to the first heartbeat probe, (2) generate a second health check data structure and/or a second look-up data structure corresponding to the second heartbeat probe message issued by the first application based on a first wave of heartbeat response messages sent in response to the second heartbeat probe, and (3) generate a third health check data structure and/or a third look-up data structure corresponding to the first heartbeat probe message issued by the second application based on a first wave of heartbeat response messages sent in response to the first heartbeat probe issued by the second application. It is understood that the second heartbeat probe message is not a subsequent heartbeat probe message to the first heartbeat probe message in this example. Rather, each of the heartbeat probe messages identified in this example may each respectively relate to one or more subsequent heartbeat probe messages.

Network device 100 may be configured to generate a data structure 130 in user space. space. In some examples, data structure 130 may be referred to as a mapping data structure 130 for the sake of clarity and explanation relative to other data structures described herein. In some examples, a mapping data structure 130 may be generated in user space by an application 104. It is therefore understood that a mapping data structure 130 may be generated by an application on a per heartbeat probe message basis, per heartbeat probe message set basis (where a set of heartbeat probe messages is defined as two or more heartbeat probe messages), per timer basis, and/or per application basis. The application 104 generating the mapping data structure 130 may be the application that issued a heartbeat probe message to which heartbeat response messages have been received in response thereto. It is therefore understood that a mapping data structure may be application-specific, heartbeat probe message specific, specific to two or more heart beat probe messages (e.g., specific to a set of heartbeat probe messages), and the like. As one example, network device 100 may generate one or more mapping data structures 130 depending on how many applications are issuing heartbeat probe messages. In such an example, if three applications running in user space on network device 100 issue their own respective heartbeat probe message(s), then the network device 100 may generate three mapping data structures 130: one for each application. Health check data structure 134, look-up data structure 132, and mapping data structure 130 are described further herein.

Referring to timers 122 and 123 illustrated in FIG. 2, it is understood that timers 122 are instantiated by one or more applications 104 and that timers 123 may be instantiated by operating system 106 or, as depicted, heartbeat handler 103. Timers 122 may include one or more transmit timers and/or one or more detection timers on a per heartbeat probe message basis, per heartbeat probe message set basis (where a set of heartbeat probe messages is defined as two or more heartbeat probe messages), and/or per application basis. As described herein, a transmit timer measures one or more intervals for network device 100 to transmit a heartbeat probe message. For example, network device 100 may transmit a heartbeat probe message when a transmit timer reaches a particular interval. For example, an application 104 may instantiate a transmit timer having an interval period of 5 second, which may mean, in some examples, that network device 100 would transmit a heartbeat probe message every 5 seconds while the timer is in operation.

In some examples, an application 104 may instantiate a transmit timer that causes network device 100 to send a heartbeat probe message two or more times within a single time interval. In other examples, a transmit timer may cause network device 100 to send a heartbeat probe message two or more times within each time interval of a plurality of time intervals. For example, more than one heartbeat probe message per interval period of a transmit timer may be sent by network device 100 resulting in destined network devices similarly responding with more than one heartbeat response message since they receive more than one heartbeat probe message. For example, if the interval period of a transmit timer is 5 seconds, two or more heartbeat probe messages may be sent by network device 100. In one example, two heartbeat probe messages within a transmit timer's interval period. In such an example, network devices receiving both heartbeat probe messages would send two heartbeat response messages to network device 100. In such examples, if network device 100 does not receive (e.g., due to network issues or otherwise) a first heartbeat response message sent from a particular network device, network device 100 will have a second chance to receive a heartbeat response message from the particular network device since two heartbeat probe messages were sent.

As described herein, a detection timer may define at least one timeliness requirement associated with one or more heartbeat probe messages. The time interval of a detection timer instantiated by an application 104 corresponding to one or more heartbeat probe messages may be more than, equal to, or less than a time interval of a transmit timer instantiated by an application 104 corresponding to the same heartbeat probe message.

Timers 123 may be application-specific, heartbeat probe message specific, specific to two or more heart beat probe messages (e.g., specific to a set of heartbeat probe messages), and the like. For example, a timer 123 may be instantiated when network device 100 is ready to send out a particular heartbeat probe message and may begin counting down when network device 100 transmits the particular heartbeat probe message to one or more network devices. An instantiated timer 123 expires after a period of time, such as 5 seconds. The period of time, which may also be referred to as a time interval, of a timer 123 may depend on the period of time of a corresponding detection timer. For example, one or more heartbeat probe messages may correspond to a transmit timer (one example of a timer 122), a detection timer (one example of a timer 122), and/or a kernel processing timer (one example and one name of a timer 123). In another example, one or more heartbeat probe message may correspond to single transmit timer, and upon expiration of the transmit timer, the application that instantiated the timer may read heartbeat response message reception values over a socket (e.g., a raw socket) from kernel space.

The transmit timer may have a first period of time, the detection timer may have a period of time dependent upon the transmit timer, and the kernel processing timer may have a period of time dependent upon the detection timer. In some examples, the period of time of a detection timer may be less than, equal to, or more than the period of time associated with the transmit timer. For example, the period of time of the detection timer may be expressed as X*(transmit timer's period of time), where X is any value above 0 (e.g., 0.3, 0.5, 0.9, 1, 1.5, 2, 3, etc). In some examples, the period of time of the kernel processing timer may be less than, equal to, or more than the period of time associated with the detection timer. For example, the period of time of the kernel processing timer may be expressed as X*(detection timer's period of time), where X is any value above 0 (e.g., 0.3, 0.5, 0.9, 1, 1.5, 2, 3, etc). However, by having the kernel processing timer be less than the detection timer, heartbeat handler 103 may be configured to ensure that a health check data structure 134 is stored to a socket's receive buffer so that when an application wakes up, the health check data structure 134 is available on the socket's receive buffer.

For example, upon network device 100 sending a heartbeat probe message, a detection timer may begin counting down and a corresponding kernel processing timer may also begin counting down. Once the detection timer expires, the application corresponding thereto (e.g., the application that instantiated the timer) may read an array of heartbeat response message reception values associated with the heartbeat probe message from a receive buffer of a socket 122. Accordingly, the period of time of the kernel processing timer may be less than the period of time of the detection timer to ensure that the array of heartbeat response message reception values is stored on the receive buffer by the time the application will access it (e.g., read it). For example, if the detection timer is 15 seconds, the kernel processing timer may be 14 second, 14.5 second, or 14.8 seconds to list a few examples. Upon the kernel processing timer expiring, heartbeat handler 103 may be configured to copy the array of heartbeat response message reception values associated with the heartbeat probe message(s) to the receive buffer in preparation of the detection timer about to expire.

While an instantiated timer 123 is counting down, network device 100 may be receiving heartbeat response messages from one or more network devices in response to the one or more network devices to having received the heartbeat probe message. The received heartbeat response messages may be stored in protocol stack 114. Instead of an application from which the heartbeat probe message was generated processing heartbeat response messages, heartbeat handler 103 processes the heartbeat response messages stored in protocol stack 114 and update the array of heartbeat response message reception values (e.g., update one or more values of a corresponding health check data structure).

In operation, one or more applications 104 may generate one or more heartbeat probe messages. Each of the one or more application 104 may open its own respective first socket (e.g., a UDP socket) and second socket (e.g., a raw socket). Each application may use the first socket (e.g., a UDP socket) to read packets (e.g., UDP packets) from protocol stack 114 and write packets (e.g., heartbeat probe messages) to protocol stack 114. Each application may use the second socket (e.g., a raw socket), and may use the second socket for reading information from kernel space and writing information to kernel space.

Network device 100 may be configured to unicast, broadcast, or multicast the one or more heartbeat probe messages. In response, network device 100 may receive a plurality of heartbeat response messages from a plurality of network devices, and store the received heartbeat response messages on protocol stack 114. Heartbeat handler 103 reads a heartbeat response message from protocol stack 114 and applies a hashing function to the source IP address in the message and/or other identification data (e.g., port number information) that identifies from which network device the heartbeat response message was received. For example, the key or input to the hashing function may be any data associated with a network device that is included in a heartbeat response message. As another example, the input to the hash function may include any data corresponding to a field in a heartbeat response message. For example, such an input may include the source IP address corresponding to a network device in examples where a heartbeat response message includes a source IP address field in, for example, a header carrying information that identifies the source IP address from where the heartbeat response message originated.

By applying the hashing function to identification data of the heartbeat response message, heartbeat handler 103 generates a hash value. Heartbeat handler determines whether the look-up data structure 132 for the application (in an example where the data structure is application specific) that issued the heartbeat response message includes the generated hash value. If the heartbeat response message read from protocol stack 114 is the first heartbeat response message received from the particular network device that sent it, then the look-up data structure 132 for the application may not include the generated hash value. However, if the heartbeat response message read from protocol stack 114 is the second heartbeat response message received from the particular network device that sent it, then the look-up data structure 132 for the application will include the generated hash value. It is therefore understood that a heartbeat probe message may be sent more than once because a first wave of heartbeat response messages results network device 100 building the requisite data structure, and any subsequent wave of heartbeat response messages results in the updating of the health check data structure. For example, the first time a heartbeat probe message is sent by an application results in the generation of the corresponding mapping data structure 130, the corresponding look-up data structure 132, and the corresponding health check data structure 134. Accordingly, network device 100 may be configured to use a first wave of heartbeat response messages received in response to a first heartbeat probe message to generate (e.g., build) these data structures. Network device may be configured to update the health check data structure 134 based on any subsequent heartbeat response message (e.g., based on a second wave of heartbeat response messages received in response to a second heartbeat probe message) once the requite data structures are built and stored in memory.

Generation of a mapping data structure 130, a look-up data structure 132, and a health check data structure 134 is now discussed with respect to a single heartbeat response message. However, it is understood that the described process is repeated for subsequent heartbeat response messages read from protocol stack 114 that constitute the first heartbeat response message received by network device 100 corresponding to other network devices.

Upon determining the look-up data structure 132 for the application (i.e., the application that issued the heartbeat probe message that the heartbeat response message was sent in response to) does not include a generated hash value, heartbeat handler 103 sends the corresponding heartbeat response message to the application over a socket, such as a UDP socket. In other examples, heartbeat handler sends instruction over a raw socket to the application instructing the application to read the heartbeat response message from protocol stack 114 over a socket, such as a UDP socket. In such examples, the application reads the heartbeat response message from protocol stack 114.

Once the application has the heartbeat response message, the application generates a mapping data structure 130 in user space. For example, the application may allocate or otherwise assign a unique index value to identification information (e.g., an IP address) corresponding to the network device from which the corresponding heartbeat response message was sent. As an example, the application may store the identification information of the network device corresponding to the heartbeat response message in a memory location pointed to by the allocated index value.

The mapping data structure 130 may correlate an index value to identification information of a network device on a per network device basis. It is understood that the mapping data structure 130 may include one or more index values that respectively map to one or more network device by respectively mapping the one or more index values to one or more pieces of network device identification information (i.e., data representative of the one or more pieces of network device identification information). The network device identification information may be derived or otherwise be parsed from the heartbeat response messages. For example, a heartbeat response message sent from a network device may include the source IP address (or more simply the IP address) of the node and/or additional identification information (e.g., port information and/or other information). As used herein, the term index value may refer to any value or data that is mapped to identification information of a network device. For example, the index value may be referred to as a bit position, a bit number, a value, and the like. The mapping data structure itself may comprise a table, an array, or any other data structure having any other format. For example, the mapping data structure may, in some examples, be referred to as an index table that maps or otherwise correlates an index value to a network device via identification information such as an IP address of the network device.

In some examples, the mapping data structure may conceptually be described as a table with at least two columns. The first column may include a plurality of row entries with each row entry corresponding to an index value. Each index value may map or otherwise correlate to one or more pieces of identification information. For example, an index value may map to an IP address corresponding to a network device. In such an example, a second column of the table in this particular example may include a plurality of row entries with each row entry corresponding to an IP address of a network device. The network device identification information (the IP address in this example) may be derived or otherwise be parsed from received heartbeat response messages. For example, a heartbeat response message sent from a network device may include the source IP address (or more simply the IP address) of the network device. Table IV below illustrates one example of mapping data structure 130 after the application allocated an index value to the first 4 heartbeat response message received in response to a heartbeat probe message for an application.

TABLE IV

| Index Value | Linear Array of Identification Information |
| --- | --- |
| 1 | IP Address of Network Device 1 |
| 2 | IP Address of Network Device 2 |
| 3 | IP Address of Network Device 3 |
| 4 | IP Address of Network Device 4 |

In the example of Table IV, it is understood that the mapping data structure 130 may include one or more index values that map to one or more network devices by mapping the one or more index values to one or more pieces of network device identification information. However, this particular example shows index values 1, 2, 3, and 4 respectively mapping to network devices 1, 2, 3, and 4. More specifically, each of index values 1, 2, 3, and 4 is shown as respectively mapping to the IP Address of Network Device 1, the IP Address of Network Device 2, the IP Address of Network Device 3, and the IP Address of Network Device 4. It is understood that the example of a mapping data structure 130 illustrated with Table IV is conceptual in that the IP addresses may be saved in memory locations accessible to the application in user space that are pointed to by each respective index value. For example, the mapping data structure of Table IV may be implemented using a one-dimensional array (which may be referred to as a linear array) where the index values are pointers to each row or element of the identification information column.

Figure 3:
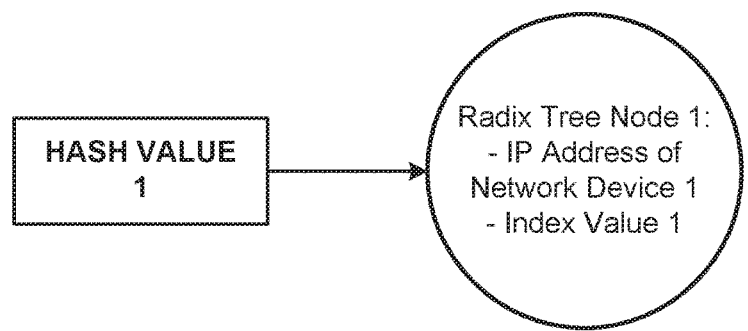
FIG. 3 illustrates an example of a look-up table data structure.

After building the mapping data structure 130 to include the allocation of an index value to the IP address corresponding to the network device from which the heartbeat response message was sent, the application sends a registration message over a socket (e.g., a raw socket) to heartbeat handler 103. The registration message includes identification information of the network device (e.g., the IP address and/or a port number) and the index value allocated to the identification information stored in mapping data structure 130 for the network device. Heartbeat handler 103 stores the hash value generated for the heartbeat response message to look-up data structure 132 and creates a radix tree (e.g., patricia tree) node corresponding to the hash value. The radix tree node stores the identification information and the index value. As hash collisions occur, the radix tree corresponding to each hash value grows (e.g., includes additional radix tree nodes). FIG. 3 illustrates one example of look-up data structure 132 after heartbeat handler 103 registers a first hash value corresponding to a first heartbeat response message. In the example of FIG. 3, the identification information is the IP address of the network device that sent the corresponding heartbeat response message. In other examples, the identification information may include the IP address and a port number of the network device that sent the corresponding heartbeat response message.

Figure 4:
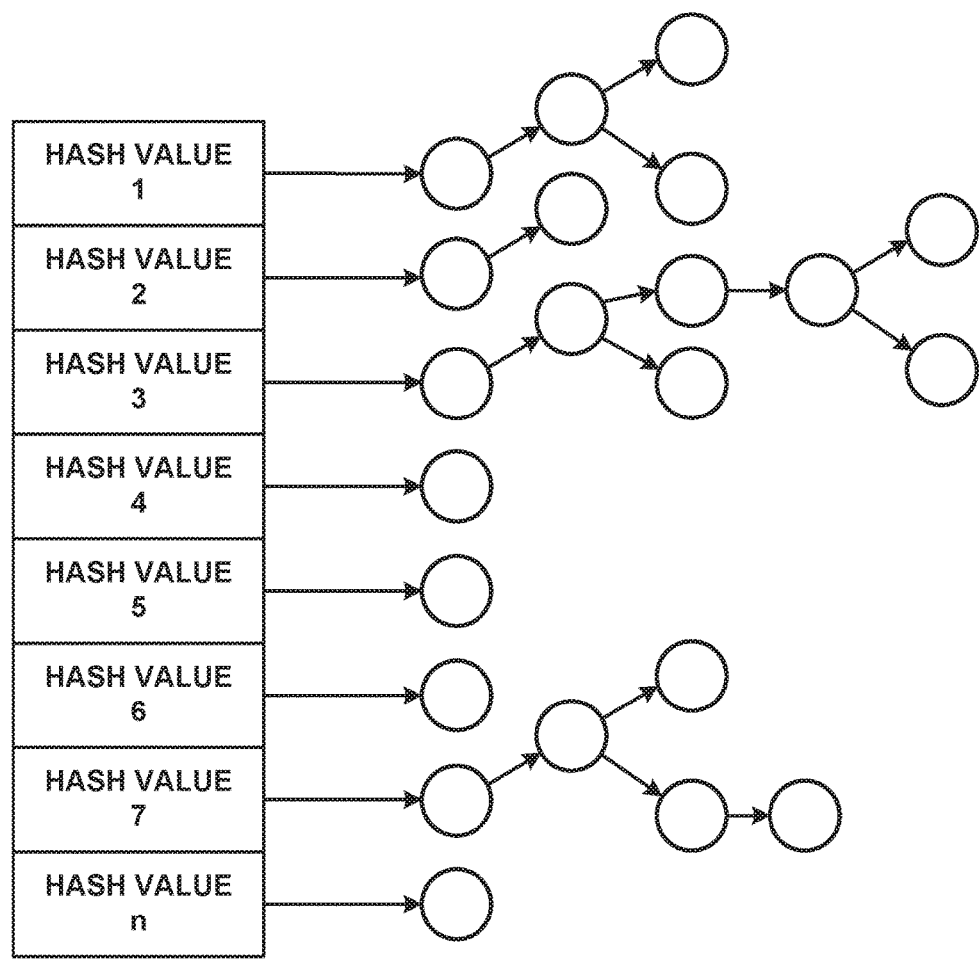
FIG. 4 illustrates an example of a look-up table data structure.

FIG. 4 illustrates one example of look-up data structure 132 after heartbeat handler 103 registers a n hash values corresponding to n first instance heartbeat response messages. In the example of FIG. 4, each radix tree node corresponds to a different network device and stores identification information and the index value corresponding to the network device with which it is associated. For example, each radix tree node stores the identification information (e.g., IP address and/or port number) of the network device that sent the heartbeat response message resulting in generation of the particular node and the index value allocated to the network device. In other examples, the identification information may include the IP address and a port number of the network device that sent the corresponding heartbeat response message. In the example of FIG. 4, the hash value of 1 is shown as having 4 radix tree nodes to represent 4 hash collisions, the hash value of 2 is shown as having 2 radix tree nodes to represent 2 hash collisions, and the like. It is therefore understood that each hash value of look-up data structure 132 may point to one or more radix tree nodes. Heartbeat handler 103 may be configured to maintain each radix tree (and each node of each radix tree) corresponding to each hash value in look-up data structure 132. The look-up data structure 132 is used by heartbeat handler 103 to maintain the association between the network device identification information (e.g., IP addresses) of network devices and their bit position in the health check data structure 134.

After building the look-up data structure 132 for a first instance of a heartbeat response message, any subsequent heartbeat response message received from the same network device previously added to the mapped data structure 130 and the look-up data structure 132 is used to update the health check data structure 134. As described herein, a health check data structure 134 may be a linear array. Heartbeat handler uses the look-up data structure 132 to save heartbeat response message reception values in the health check data structure 134 (e.g., a health check linear array) in the appropriate bit position.

For example, heartbeat handler 103 reads a heartbeat response message from protocol stack 114 and applies a hashing function to the source IP address in the message and/or other identification data (e.g., port number information) that identifies from which network device the heartbeat response message was received. By applying the hashing function to identification data, such as the IP address, of the heartbeat response message, heartbeat handler 103 generates a hash value. Heartbeat handler 103 determines whether the look-up data structure 132 for the application (in an example where the data structure is application specific) that issued the heartbeat response message includes the generated hash value. If the heartbeat response message read from protocol stack 114 is the second heartbeat response message received from the particular network device that sent it, then the look-up data structure 132 for the application will include the generated hash value. Since there is the possibility of hash value collision, heartbeat handler 103 determines whether a radix tree node including identification information of the network device corresponding to the heartbeat response message under analysis is mapped to the hash value in look-up data structure 132. If there is no such radix tree node, then heartbeat handler 103 sends the corresponding heartbeat response message to the application over a socket, such as a UDP socket, in the manner described herein. In other examples, heartbeat handler sends instruction over a raw socket to the application instructing the application to read the heartbeat response message from protocol stack 114 over a socket, such as a UDP socket, in the manner described herein.

If heartbeat handler 103 determines that there is a radix tree node that includes identification information of the network device corresponding to the heartbeat response message under analysis is mapped to the hash value in look-up data structure 132, the heartbeat handler 103 reads the index value (which may also be referred to as a bit position) stored in the radix tree node. Heartbeat handler then updates a heartbeat response message reception value corresponding to the index value read from the radix tree node in the health check data structure 134.

Upon the expiration of a period of time (e.g., upon expiration of a timer 122 in user space), an application that sent heartbeat probe messages may issue a read request on a socket (e.g., a raw socket). Heartbeat handler 103 may receive the read request over the socket and load the array of heartbeat response message reception values onto a buffer of the socket. The application then in turn may read the array of heartbeat response message reception values and determine the status of each network device corresponding to each bit position of the array.

In some examples, network device 100 may send a first heartbeat probe message corresponding to a first set of data structures (e.g., a first mapping data structure, a first look-up data structure, and a first health check data structure) and start a first timer 123, and send a second heartbeat probe message corresponding to a second set of data structures (e.g., a second mapping data structure, a second look-up data structure, and a second health check data structure) and start a second timer 123. While both the first timer 123 and the second timer 123 are counting down, network device 100 is receiving one or more heartbeat response messages sent in response to the first and second heartbeat probes, and stores the received heartbeat response messages in protocol stack 114. Heartbeat handler 103 is configured to filter heartbeat response messages stored in protocol stack 114 from other messages stored in protocol stack 114 (e.g., non-heartbeat messages) based on one or more bit patterns. For example, a first bit pattern present in a message may indicate that the message is a heartbeat response message sent in response to the first heartbeat probe message, and a second bit pattern present in a message may indicate that the message is a heartbeat response message sent in response to the second heartbeat probe message.

Applying a bit pattern filter, heartbeat handler 103 may determine which messages from protocol stack 114 to process. For example, heartbeat handler 103 may be configured to determine that a first message stored in protocol stack 114 is a heartbeat response message sent in response to the first heartbeat probe message, and determine that a subsequent message stored in protocol stack 114 is a heartbeat response message sent in response to the second heartbeat probe message.

It is therefore understood that in accordance with the techniques described in this disclosure, applications 104 may determine the operational status of network devices without reading or processing any heartbeat response messages after the mapping data structure, the look-up data structure, and the health check data structures are generated. Instead, applications 104 may determine the operational status of network devices by reading an array of heartbeat response message reception values from kernel space over a socket. For example, for each bit position in the array of heartbeat response message reception values having a value indicating that a heartbeat response message was not received, an application may be configured to take appropriate action against the corresponding network device. Accordingly, the heartbeat response messages from n network devices may be reduced to n bits being copied from kernel space to the user space. For example, for 10,000 network devices being monitored, network device 100 may be configured to copy 10,000 bits (1250 bytes) instead of 10,000 heartbeat messages from kernel space to the user space. Even assuming that a heartbeat message includes just 20 bits (which may be considered a small number in view of heartbeat messaging protocols) and continuing with the 10,000 monitored network devices example, network device 100 may be configured to copy 10,000 bits (1250 bytes) instead of 200,000 bits from kernel space to the user space.

Network device 100 may be configured to monitor 10,000 to 20,000 (or more, in other examples) network devices. In such an example, the number of heartbeat messages received and stacked by network device 100 for processing is very high. In such an example, even though network device 100 may be functioning normally, the increased scale of servicing a high number of nodes results in a heavy load of heartbeat message processing for network device 100 potentially causing processing delays of received heartbeat messages. As described herein, failure to process a heartbeat message within timeliness requirements may cause network device 100 to spuriously determine that one or more network devices that actually sent a heartbeat response message to network device 100 (and was received by network device 100) to be marked spuriously as unhealthy. For example, even though a heartbeat message may be received by network device 100, due to the number of other received heartbeat messages, network device 100 may be unable to process the heartbeat message within the timeliness requirements corresponding to the heartbeat message protocol. Accordingly, network device 100 may mark the node falsely despite having received the heartbeat message within any timeliness requirement associated with the heartbeat request. One or more techniques described herein may reduce the processing load of processing the heartbeat messages at network device 100. For example, instead of one or more applications 104 executing in user space on network device 100 processing the received heartbeat messages, network device 100 may be configured to process received heartbeat messages in kernel space as described herein.

Figure 5:
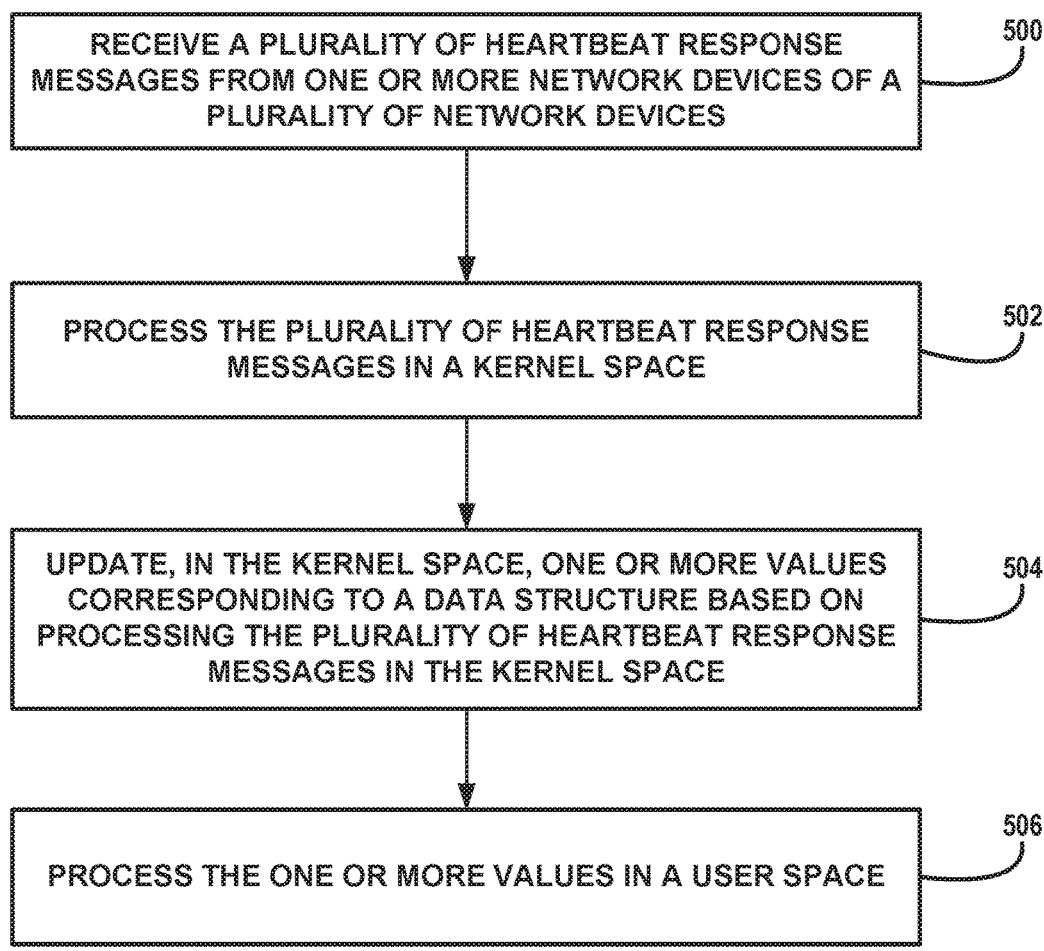
FIG. 5 is a block diagram illustrating an exemplary router in accordance with the disclosure herein.

FIG. 5 is a flowchart showing an example method of the disclosure. The method of FIG. 5 may be carried out by one or more components of network device 100. FIG. 5 depicts one example method consistent with one or more techniques of this disclosure.

In the example of FIG. 5, network device 100 may be configured to receive a plurality of heartbeat response messages from one or more network devices of a plurality of network devices (500). Each heartbeat response message of the plurality of heartbeat response messages may respectively correspond to one network device of the plurality of network devices. Network device 100 may be configured to process the plurality of heartbeat response messages in a kernel space of network device 100 (502).

Network device 100 may be configured to update, in the kernel space, one or more values corresponding to a data structure based on processing the plurality of heartbeat response messages in the kernel space (504). Each value of the one or more values may respectively correspond to one network device of the plurality of network devices. Each value of the one or more values may be indicative of whether a heartbeat response message was received by network device 100 from the respective one network device respectively corresponding to each value of the one or more values. In some examples, each value of the one or more values may uniquely corresponds to one network device of the plurality of network devices. In some examples, the data structure may be a one-dimensional array. In some examples, each value of the one or more values may be a one-bit value (e.g., a 0 or a 1).

Network device 100 may be configured to process the one or more values in a user space of network device 100 (506). In some examples, network device 100 may be configured to process the one or more values in the user space of network device 100 without processing the plurality of heartbeat response messages in the user space.

In some examples, network device 100 may be configured to read, by an application running in the user space of network device 100, the one or more values from the kernel space of network device 100. For example, network device 100 may be configured to read, by an application running in the user space of network device 100, the one or more values from a data buffer over a socket. In such an example, the socket may be a raw socket.

In some examples, network device 100 may be configured to determine, in the user space, whether a heartbeat response message was received from each network device of the plurality of network devices based on processing the one or more values in the user space and without processing the plurality of heartbeat response messages in the user space. In other examples, network device 100 may be configured to determine, in the user space, whether a heartbeat response message was received from each network device of the plurality of network devices based on processing the one or more values in the user space. In such examples, network device 100 may be configured to determine whether a heartbeat response message was received from each network device of the plurality of network devices by being configured to: determine from which network devices of the plurality of network devices a heartbeat response message was received based on processing the one or more values in the user space, and/or determine from which network devices of the plurality of network devices a heartbeat response message was not received based on processing the one or more values in the user space.

In some examples, network device 100 may be configured to process the plurality of heartbeat response messages in the kernel space by being configured to generate, using a hashing function, a hash value for each heartbeat response message of the plurality of heartbeat response messages. Each generated hash value may respectively correspond to one or more radix tree nodes (e.g., one or more patricia tree nodes). Each radix tree node of the one or more radix tree nodes may respectively correspond to one network device of the plurality of network devices. Each radix tree node may include identification information that identifies which network device of the plurality of network devices corresponds to the particular radix tree node. Each radix tree node may also include a value that identifies a bit position in the data structure. In some examples, the identification information corresponding to each radix tree node includes at least one of: an IP address of the network device corresponding to the radix tree node or a port number of the network device corresponding to the radix tree node.

In some examples, network device 100 may be configured to apply the hashing function to data corresponding to at least one field of data for each of the plurality of heartbeat response messages. The data corresponding to the at least one field of data for each of the plurality of heartbeat response messages may include a source IP address.

In some examples, network device 100 may be configured to multicast at least one heartbeat request message to the plurality of network devices. In such examples, receiving the plurality of heartbeat response messages from the plurality of network devices may include network device 100 receiving the plurality of heartbeat response messages in response to multicasting the at least one heartbeat request message to the plurality of network devices. In other examples, network device 100 may be configured to broadcast at least one heartbeat request message to the plurality of network devices. In such examples, receiving the plurality of heartbeat response messages from the plurality of network devices may include network device 100 receiving the plurality of heartbeat response messages in response to broadcasting the at least one heartbeat request message to the plurality of network devices.

The techniques described in this disclosure may be implemented in hardware or any combination of hardware and software (including firmware). Any features described as units, modules, or components may be implemented together in an integrated logic device or separately as discrete but interoperable logic devices. If implemented in hardware, the techniques may be realized in a processor, a circuit, a collection of logic elements, or any other apparatus that performs the techniques described herein. If implemented in software, the techniques may be realized at least in part by a non-transitory computer-readable storage medium or computer-readable storage device encoded with, having stored thereon, or otherwise comprising instructions that, when executed, cause one or more processors, such as programmable processor(s), to perform one or more of the methods described above. The non-transitory computer-readable medium may form part of a computer program product, which may include packaging materials. The non-transitory computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein, may refer to any of the foregoing structures or any other structure suitable for implementation of the techniques described herein. Likewise, the term "control unit," as used herein, may refer to any of the foregoing structures or any other structure suitable for implementation of the techniques described herein. In addition, in some aspects, the functionality described herein may be provided within dedicated software and hardware units configured to perform the techniques of this disclosure. Depiction of different features as units is intended to highlight different functional aspects of the devices illustrated and does not necessarily imply that such units must be realized by separate hardware or software components. Rather, functionality associated with one or more units may be integrated within common or separate hardware or software components.

Various examples have been described. These and other examples are within the scope of this disclosure.

What is claimed is:

1. In a network having a plurality of network devices, including a first network device, wherein the first network device includes a memory having a health check data structure, the health check data structure including a heartbeat response message field for each respective network device of the plurality of network devices, a method comprising:
receiving, by the first network device, heartbeat response messages from two or more of the plurality of network devices, wherein each heartbeat response message respectively corresponds to one network device of the plurality of network devices;
processing the received heartbeat response messages in a kernel space of the first network device, wherein processing includes:
generating a hash value for each heartbeat response message received, each hash value based on identification information in the respective heartbeat response message, the identification information identifying the network device that sent the respective heartbeat response message; and
determining, for each of the plurality of heartbeat response messages and based at least in part on the corresponding hash value generated for the heartbeat response message, an index value, each index value associated with the network device that sent the respective heartbeat response message; and
updating the health check data structure at the heartbeat response message fields indicated by the index values to indicate that heartbeat response messages were received from the network devices; and
processing, in a user space of the first network device, information received from at least one of the heartbeat response message fields of the health check data structure to obtain health status associated with one or more of the plurality of network devices.

2. The method of claim 1, further comprising:
reading, by an application in the user space of the first network device, one or more values stored in the health check data structure from the kernel space.

3. The method of claim 2, further comprising:
reading, by an application in the user space of the first network device, one or more values stored in the health check data structure from a data buffer over a socket.

4. The method of claim 1, further comprising:
determining, by the first network device in the user space, whether a heartbeat response message was received within a predetermined time period from each network device of the plurality of network devices based on processing, in the user space, one or more values stored in the health check data structure.

5. The method of claim 1, wherein processing, by the first network device and in a user space of the first network device, the health check data structure to obtain health status of one or more of the plurality of network devices includes at least one of:
determining the network devices of the plurality of network devices that sent a heartbeat response message; or
determining the network devices of the plurality of network devices that did not send a heartbeat response message.

6. The method of claim 1, wherein the identification information includes a source IP address.

7. The method of claim 1, wherein the data structure is a one-dimensional array.

8. The method of claim 1, further comprising:
multicasting or broadcasting, by the first network device, at least one heartbeat request message to the plurality of network devices.

9. The method of claim 2, wherein each value of the one or more values is a one-bit value.

10. The method of claim 1, wherein each generated hash value respectively corresponds to one or more patricia tree nodes, wherein each patricia tree node respectively corresponds to one network device of the plurality of network devices and includes a value that identifies a bit position in the data structure.

11. The method of claim 1, wherein generating a hash value for each heartbeat response message received includes:
determining if there is an index value in the look up table associated with the network device that sent the respective heartbeat response message; and
if no index value in the look up table is associated with the network device that sent the respective heartbeat response message, generating an index value and storing the generated hash value and corresponding generated index value to the look up table.

12. The method of claim 1, wherein generating a hash value for each heartbeat response message received includes:
determining if the generated hash value is present in a look up table of generated hash values;
if the generated hash value is not present in the look up table of generated hash values:

generating an index value for the respective heartbeat response message, the index value associated with the network device that sent the respective heartbeat response message; and storing the generated hash value and corresponding index value to the look up table.

13. The method of claim 12, wherein generating a hash value for each heartbeat response message received further includes:

determining if there is an index value in the look up table associated with the network device that sent the respective heartbeat response message; and if no index value in the look up table is associated with the network device that sent the respective heartbeat response message, generating an index value and storing the generated hash value and corresponding generated index value to the look up table.

14. A method, comprising:

receiving, by a first network device, a plurality of heartbeat response messages from one or more network devices of a plurality of network devices, wherein each heartbeat response message of the plurality of heartbeat response messages respectively corresponds to one network device of the plurality of network devices;

processing, by the first network device, the plurality of heartbeat response messages in a kernel space of the first network device;

updating, by the first network device in the kernel space, one or more values corresponding to a data structure based on processing the plurality of heartbeat response messages in the kernel space, wherein each value of the one or more values respectively corresponds to one network device of the plurality of network devices, and wherein each value of the one or more values is indicative of whether a heartbeat response message was received by the first network device from the respective one network device respectively corresponding to each value of the one or more values; and processing, by the first network device, the one or more values in a user space of the first network device, wherein processing the plurality of heartbeat response messages in the kernel space includes generating, using a hashing function, a hash value for each heartbeat response message of the plurality of heartbeat response messages, the hash value based on identification information in the respective heartbeat response message that identifies the network device that sent the respective heartbeat response message, wherein each generated hash value respectively corresponds to one or more radix tree nodes, wherein each radix tree node of the one or more radix tree nodes respectively corresponds to one network device of the plurality of network devices and includes a value that identifies a bit position in the data structure.

15. The method of claim 14, wherein the identification information includes at least one of: an IP address or a port number.

16. A network device comprising:

one or more programmable processors; and a memory coupled to the one or more processors, the memory having instructions stored thereon that, when executed by the one or more programmable processors, cause the one or more programmable processors to:

process, in kernel space, heartbeat response messages received from a plurality of network devices, wherein each heartbeat response message of the plurality of heartbeat response messages respectively corresponds to one network device of the plurality of network devices, wherein processing includes:

generating a hash value for each heartbeat response message received, each hash value based on identification information in the respective heartbeat response message, the identification information identifying the network device that sent the respective heartbeat response message; and determine, for each of the plurality of heartbeat response messages and based at least in part on the corresponding hash value generated for the heartbeat response message, an index value, each index value associated with the network device that sent the respective heartbeat response message;

update, in the kernel space, a health check data structure at heartbeat response message fields indicated by the retrieved index values, the update to indicate that heartbeat response messages were received from the network devices; and process information received from at least one of the heartbeat response message fields of the health check data structure in a user space to obtain health status associated with one or more of the plurality of network devices.

17. The network device of claim 16, wherein the instructions that, when executed by the one or more programmable processors, cause the one or more programmable processors to process information received from the health check data structure in a user space to obtain health status of one or more of the plurality of network devices include instructions that, when executed by the one or more programmable processors, cause the one or more programmable processors to perform at least one of:

determining the network devices of the plurality of network devices that sent a heartbeat response message; or determining the network devices of the plurality of network devices that did not send a heartbeat response message.

18. The network device of claim 16, wherein each generated hash value respectively corresponds to one or more radix tree nodes, wherein each radix tree node of the one or more radix tree nodes respectively corresponds to one network device of the plurality of network devices.

19. The network device of claim 18, wherein the identification information includes at least one of: an IP address or a port number.

20. The network device of claim 19, wherein each radix tree node includes a value that identifies a bit position in the health check data structure.

21. A non-transitory computer-readable storage medium encoded with instructions that, when executed, cause at least one processor of a networking device to:

process, in kernel space, heartbeat response messages received from a plurality of network devices, wherein each heartbeat response message of the plurality of heartbeat response messages respectively corresponds to one network device of the plurality of network devices, wherein processing includes:

generating a hash value for each heartbeat response message received, each hash value based on identification information in the respective heartbeat response message, the identification information identifying the network device that sent the respective heartbeat response message; and determining, for each of the plurality of heartbeat response messages and based at least in part on the corresponding hash value generated for the heartbeat response message, an index value, each index value associated with the network device that sent the respective heartbeat response message;

update, in the kernel space, a health check data structure at heartbeat response message fields indicated by the retrieved index values, the update to indicate that heartbeat response messages were received, from the plurality of network devices; and process information received from at least one of the heartbeat response message fields of the health check data structure in a user space to obtain health status associated with one or more of the plurality of network devices.

22. The computer-readable storage medium of claim 21, wherein each generated hash value respectively corresponds to one or more radix tree nodes, wherein each radix tree node of the one or more radix tree nodes respectively corresponds to one network device of the plurality of network devices.

23. The computer-readable storage medium of claim 22, wherein each radix tree node includes a value that identifies a bit position in the health check data structure.

* * * * *